US012693776B2

(12) United States Patent
Elimelech

(10) Patent No.: US 12,693,776 B2
(45) Date of Patent: Jul. 28, 2026

(54) DISPLAYING MULTIPLE REPRESENTATIONS OF SYSTEM MANAGEMENT OPERATIONS IN A USER INTERFACE

(71) Applicant: RED HAT, INC., Raleigh, NC (US)

(72) Inventor: Ran Elimelech, Sacramento (CA)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 17/513,806

(22) Filed: Oct. 28, 2021

(65) Prior Publication Data

US 2023/0132877 A1    May 4, 2023

(51) Int. Cl.
*G06F 3/0484*      (2022.01)
*G06F 3/0482*      (2013.01)
*G06F 3/04847*     (2022.01)
*G06F 9/451*       (2018.01)
*G06F 9/455*       (2018.01)

(52) U.S. Cl.
CPC ........ *G06F 3/04847* (2013.01); *G06F 3/0482* (2013.01); *G06F 9/453* (2018.02); *G06F 9/45558* (2013.01); *G06F 2009/45562* (2013.01)

(58) Field of Classification Search
CPC .................................... G06F 8/30; G06F 8/34
See application file for complete search history.

(56) References Cited

U.S. PATENT DOCUMENTS 5,617,527 A     4/1997 Kressin et al.
7,849,440 B1 * 12/2010 Englehart ................. G06F 8/34
                                                    717/109

8,694,886 B2 *  4/2014 Acedo ................. G06F 9/45512
                                                    715/708
9,798,522 B2   10/2017 Strachota et al.
10,489,122 B1 * 11/2019 Abbott ...................... G06F 8/34
(Continued)

OTHER PUBLICATIONS

Mitchell, Nick. "Visualizing Kubernetes in a Terminal," including screenshots from an embedded gif [published Jun. 10, 2019], [online], [ retrieved on Nov. 3, 2022]. Retrieved from the internet <URL: https://medium.com/the-graphical-terminal/ navigating-kubernetes-with-kui-22819840b40c > (Year: 2019).*

(Continued)

*Primary Examiner* — Irete F Ehichioya
*Assistant Examiner* — Samuel Shen
(74) *Attorney, Agent, or Firm* — Womble Bond Dickinson (US) LLP

(57) ABSTRACT

An example method includes receiving, via a text input component of a containerized cluster user interface, text that includes an operation name that identifies a containerized cluster operation, wherein the text further includes a textual parameter name and a textual parameter value. The method further includes identifying a form field name that corresponds to the textual parameter name, wherein the form field name is identified using a mapping data structure associated with the containerized cluster operation, the mapping data structure includes one or more mappings, and each mapping associates a particular field name with a corresponding particular parameter name. The method may further include generating a form field value in view of the textual parameter value, and presenting the form field value in a form field identified by the form field name. The form field value and the text in the text input component may be simultaneously visible.

19 Claims, 13 Drawing Sheets

(56)                    References Cited

U.S. PATENT DOCUMENTS

| | | | |
|---|---|---|---|
| 11,416,319 | B1 * | 8/2022 | Katahanas ............ G06F 3/0482 |
| 2005/0229154 | A1 * | 10/2005 | Hiew ......................... G06F 8/34 |
| | | | 717/110 |
| 2006/0184537 | A1 * | 8/2006 | Sauve ................... G06F 3/0482 |
| 2008/0022259 | A1 * | 1/2008 | MacKlem ................. G06F 8/34 |
| | | | 717/113 |
| 2008/0155565 | A1 * | 6/2008 | Poduri ................ G06F 9/45512 |
| | | | 719/320 |
| 2009/0125877 | A1 * | 5/2009 | Kuzsma, Jr. et al. .... G06F 8/74 |
| | | | 717/105 |
| 2009/0172541 | A1 * | 7/2009 | Acedo ..................... G06F 3/048 |
| | | | 715/708 |
| 2011/0145703 | A1 * | 6/2011 | Nematollahi Mahani ................... |
| | | | G06F 8/34 |
| | | | 715/810 |
| 2012/0057082 | A1 * | 3/2012 | Dunn ..................... H04N 21/00 |
| | | | 348/739 |
| 2016/0162166 | A1 * | 6/2016 | Kleine-Horst ........ G06F 40/166 |
| | | | 715/762 |
| 2021/0103431 | A1 * | 4/2021 | Reid ......................... G06F 8/33 |

OTHER PUBLICATIONS

Vaithilingam, et al., "Bespoke: Interactively Synthesizing Customer GUIs from Command-Line Applications By Demonstration." UIST'19, Oct. 20-23, 2019, New Orleans, LA, USA. 14 pages.
Gasparic, et al., "GUI Design for IDE Command Recommendation." IUI 2017—Machine Learning, Mar. 13-16, 2017, Limassol, Cyprus.

* cited by examiner

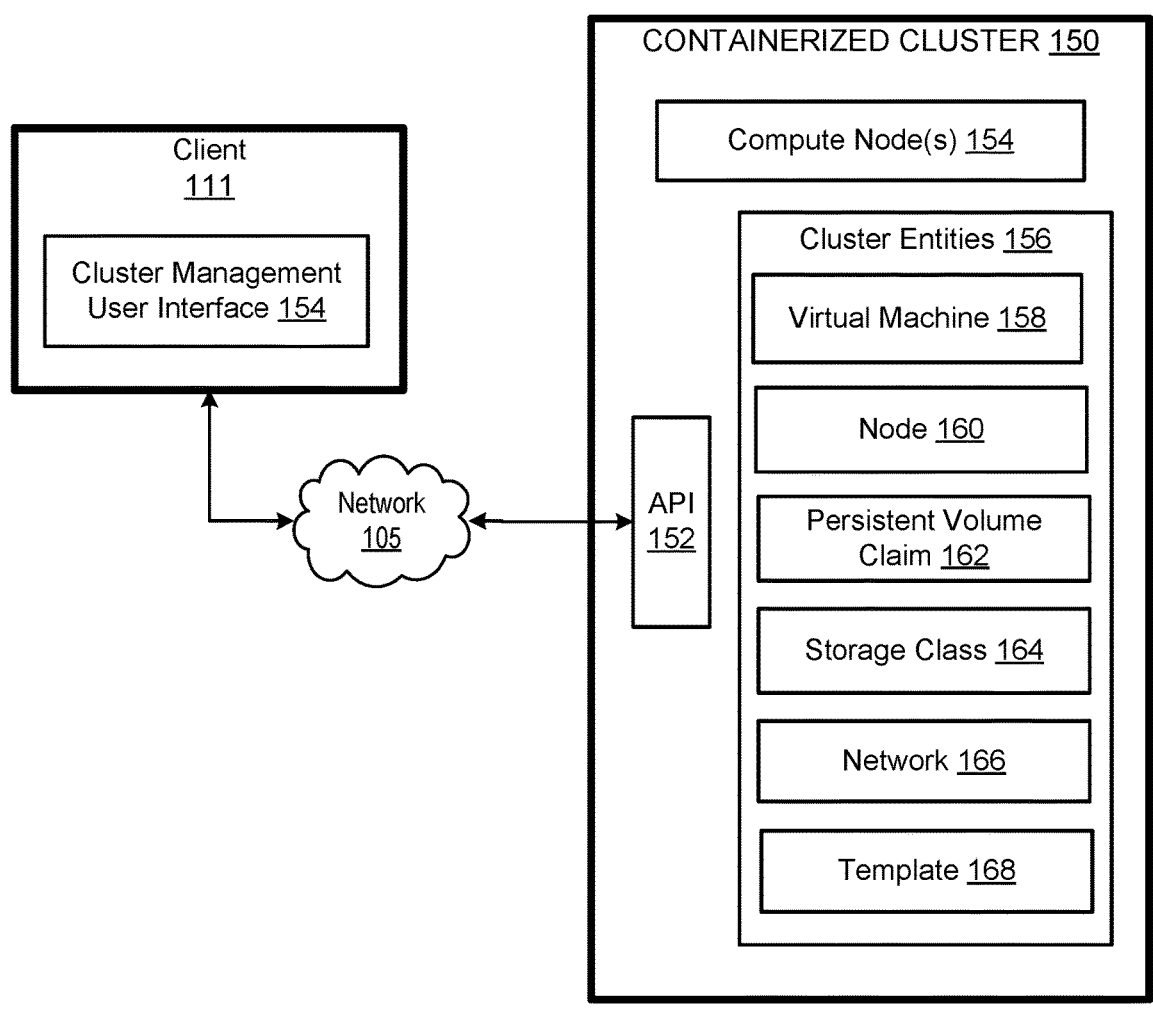
FIG. 1

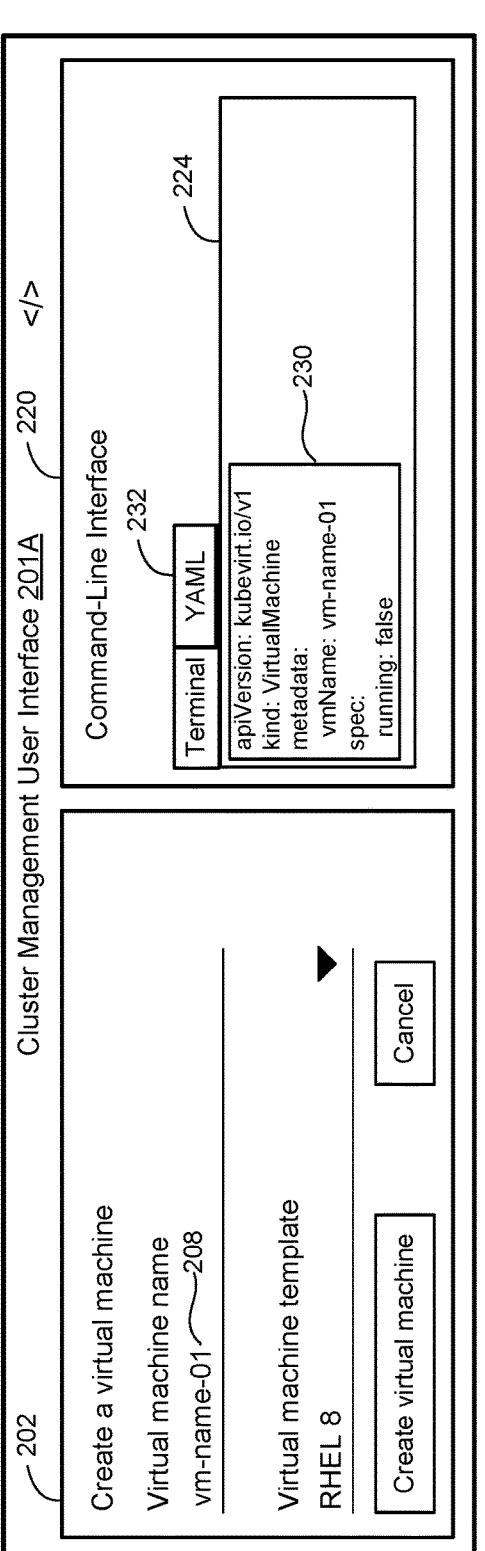
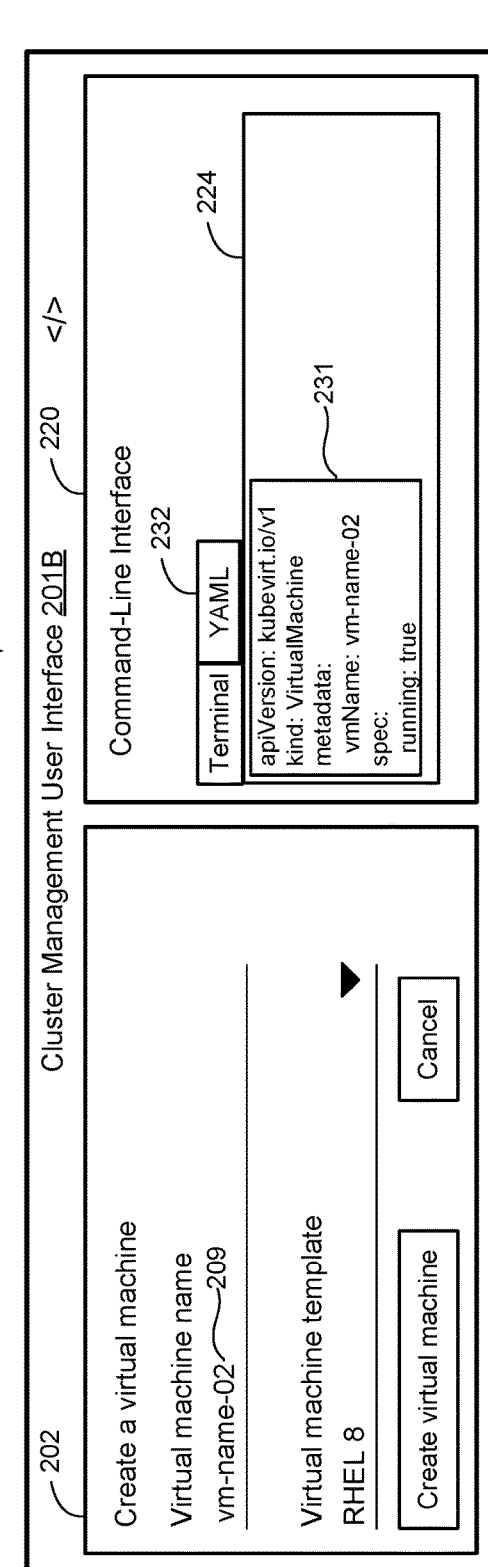
User changes "name: vm-name-01"
to "name: vm-name-02"
FIG. 2B

Mapping Table 300

| GUI Form Field Description | GUI Form Field Name | Text Parameter Name |
|---|---|---|
| Virtual Machine Name | vmname | metadata.vmName |
| Operating System | os | annotations.name.os |
| Boot Source | boot-src | spec.source.http |
| Flavor | flavor | spec.template.metadata.annotations.vm/flavor |
| Workload Type | workload | spec.template.metadata.annotations.vm/workload |
| Start VM | start-vm | spec.running |

Receive, via a text input component of a containerized cluster user interface, text that includes an operation name that identifies a containerized cluster operation, wherein the text further includes a textual parameter name and a textual parameter value
<u>410</u>

Identify a form field name that corresponds to the textual parameter name, wherein the form field is identified using a mapping data structure associated with the containerized cluster operation, wherein the mapping data structure comprises one or more mappings, and each of the mappings associates a particular field name with a corresponding particular parameter name
<u>420</u>

Generate a form field value in view of the textual parameter value
<u>430</u>

Present the form field value in a form field identified by the form field name
<u>440</u>

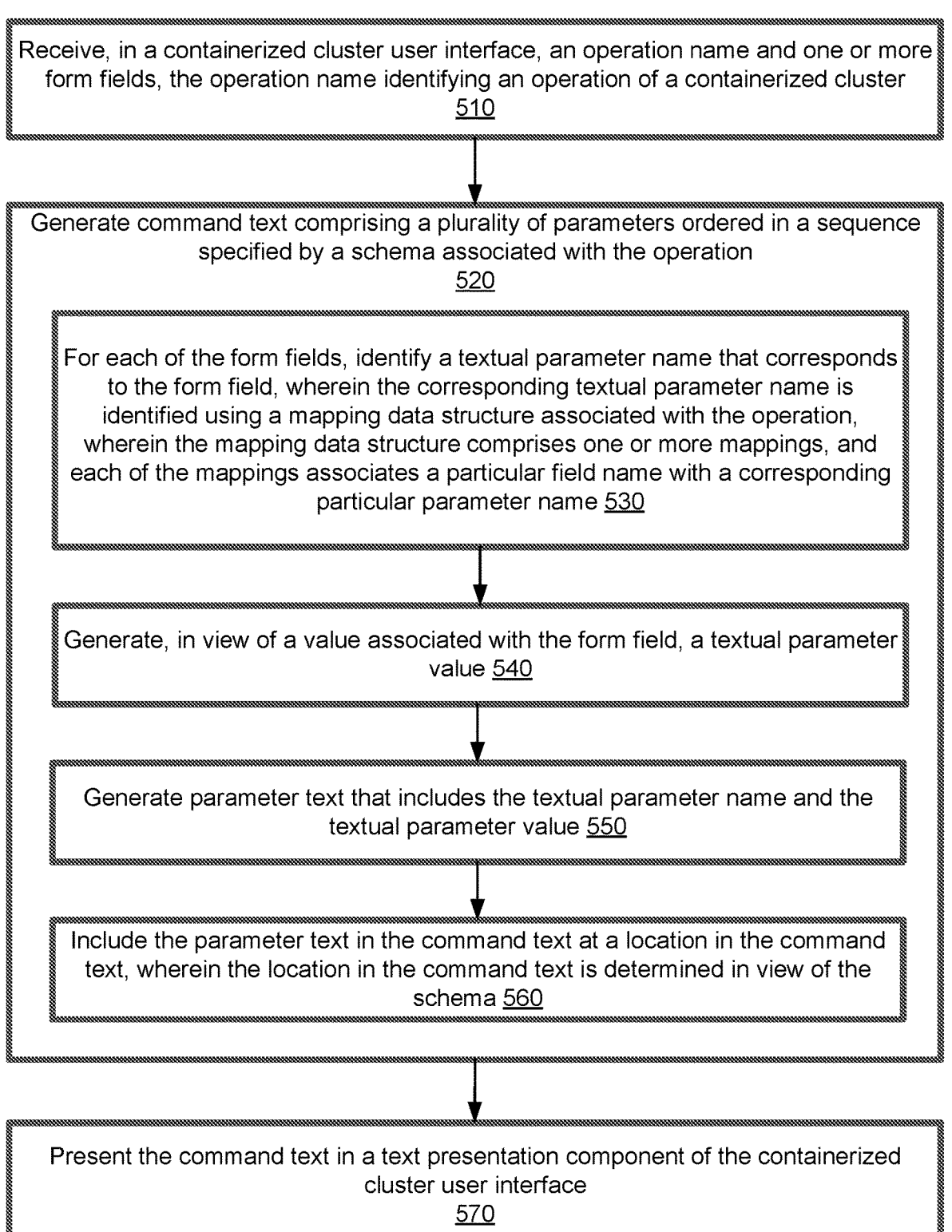

Receive, in a containerized cluster user interface, an operation name and one or more form fields, the operation name identifying an operation of a containerized cluster
510

Generate command text comprising a plurality of parameters ordered in a sequence specified by a schema associated with the operation
520

For each of the form fields, identify a textual parameter name that corresponds to the form field, wherein the corresponding textual parameter name is identified using a mapping data structure associated with the operation, wherein the mapping data structure comprises one or more mappings, and each of the mappings associates a particular field name with a corresponding particular parameter name 530

Generate, in view of a value associated with the form field, a textual parameter value 540

Generate parameter text that includes the textual parameter name and the textual parameter value 550

Include the parameter text in the command text at a location in the command text, wherein the location in the command text is determined in view of the schema 560

Present the command text in a text presentation component of the containerized cluster user interface
570

FIG. 5

DISPLAYING MULTIPLE REPRESENTATIONS OF SYSTEM MANAGEMENT OPERATIONS IN A USER INTERFACE

TECHNICAL FIELD

The present disclosure is generally related to computer systems, and more particularly, to displaying multiple representations of system management operations in a user interface.

BACKGROUND

A Graphical User Interface ("GUI") displays items such as text and images that represent objects in a computer system, such as input data and output data. A user can use an input device, such as a mouse, touch screen, or keyboard, to select particular items and perform corresponding actions, such as entering input data, starting an application program, or manipulating an object such as a file. The displayed items can include buttons, which the user can select to cause the computer system to perform a corresponding action, such as submitting a request. The displayed items can also include menus from which a user can select items that represent actions or input values, for example. A command-line interface ("CLI"), in contrast, prompts the user to enter a command in the form of text that conforms to a particular syntax. For example, a command may be entered in a CLI "shell" syntax, and executed by the shell, which provides an interface between the commands and an operating system that performs operations specified by the commands. Commands may be words, e.g., "ls" to display a list of files, or "copy" to copy a file. The "copy" command can have parameters that include, for example, the name of the file to be copied and a directory to which the file is to be copied. The CLI does not ordinarily attempt to guide or otherwise assist the user. The user is expected to know which command, can be entered and what parameters to provide to each command to perform a desired task.

BRIEF DESCRIPTION OF THE DRAWINGS

The present disclosure is illustrated by way of examples, and not by way of limitation, and may be more fully understood with references to the following detailed description when considered in connection with the figures, in which:

FIG. 1 depicts a high-level block diagram of an example computing environment that includes a cluster management user interface, in accordance with one or more aspects of the present disclosure;

FIG. 2B depicts an example user interface of a cluster management tool showing a change in a parameter of a text command of a CLI, and a consequent change in a corresponding mapped form field of a GUI, in accordance with one or more aspects of the present disclosure;

FIG. 3 depicts an example data structure representing a mapping between graphical and textual representations of a command that creates a virtual machine, in accordance with one or more aspects of the present disclosure;

FIG. 4 depicts a flow diagram of an example method for determining a value of a form field based on a corresponding mapped parameter of a text command, in accordance with one or more aspects of the present disclosure;

FIG. 5 depicts a flow diagram of an example method for generating command text that includes a parameter based on a corresponding value of a mapped form field, in accordance with one or more aspects of the present disclosure;

DETAILED DESCRIPTION

Figure 2A:
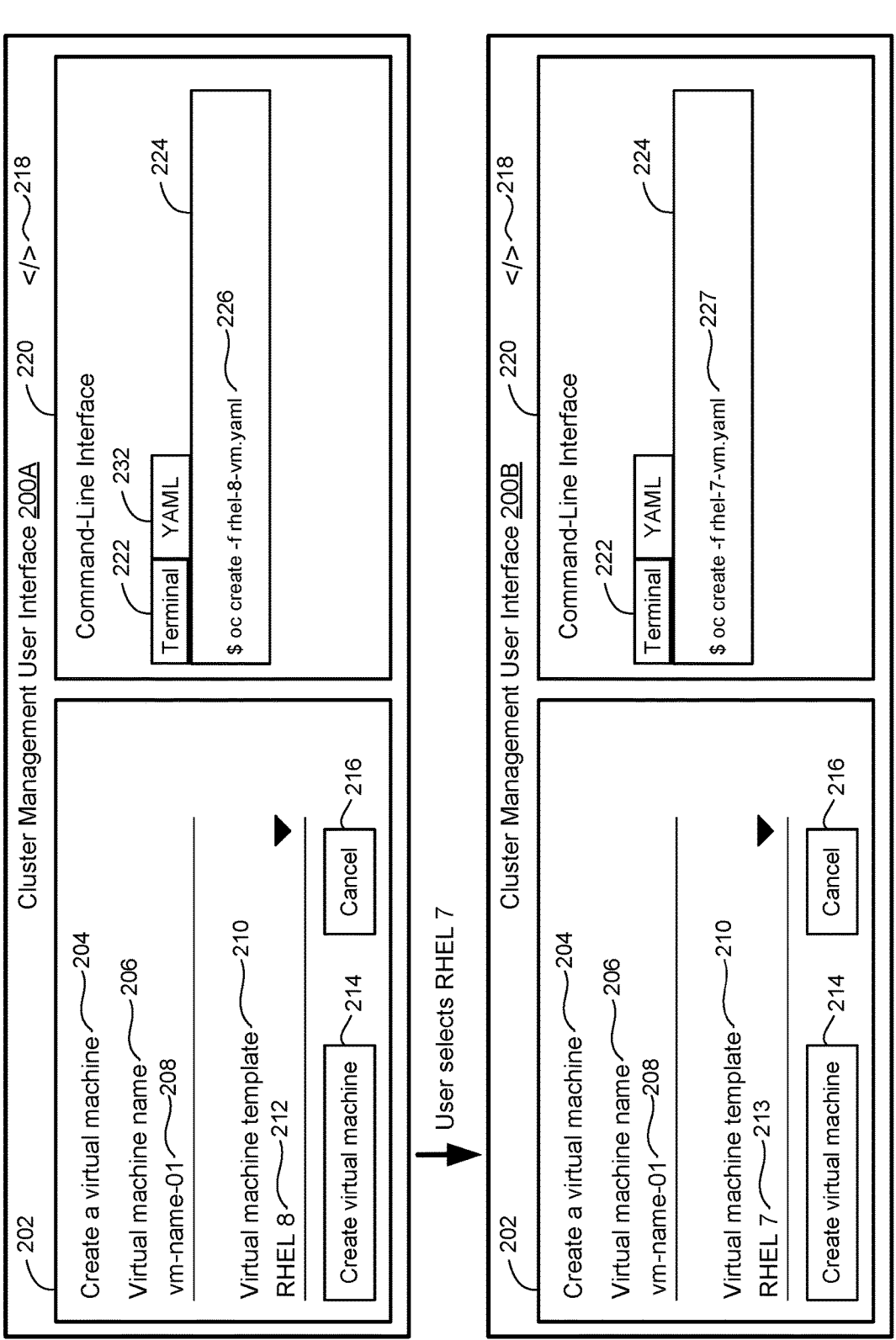
FIG. 2A depicts an example user interface of a cluster management tool showing a change in a form field of a GUI, and a consequent change in a corresponding mapped parameter of a text command of a CLI, in accordance with one or more aspects of the present disclosure.

Described herein are systems and methods for displaying multiple representations of system management operations in a user interface. A containerized cluster user interface can be used by a user, e.g., a system admin, developer, operations manager, or the like to configure a containerized cluster. The user interface can be used to define cluster object, such as applications, pods, and son on, and to cause applications to execute on the containerized cluster. The containerized cluster user interface can include a Graphical User Interface ("GUI"), which can display a "wizard" or other step-by-step sequence of forms in which the user can input configuration values. Each form may include one or more fields, each of which can have a descriptive label and an input component such as a text box or a selection list: for example, a GUI can include a wizard that creates a virtual machine in the containerized cluster. The GUI can display menus listing operations that can be performed by the containerized cluster. The user can select a menu item, such a "Create Virtual Machine," and in response, the GUI can present a form that includes fields corresponding to the input parameters of the containerized cluster's Create Virtual Machine operation. The input fields can include, e.g., a VM name field, as OS field, and a boot source field that specifies a URL or other location of an image to load into the VM. The user can input a value for each of the fields, and submit the form, e.g., by clicking a "create" button. The GUI can then invoke a containerized cluster API operation, which can create a VM using the parameter values provided by the user in the form fields, and display the status and results of the operation. Thus, the GUI is structured for ease of use, since the GUI displays menus listing operations that can be selected. Further, the GUI displays a form listing the fields for the selected operation, the GUI can be used by users who are not experts in the operation of the containerized cluster.

Because of their emphasis on ease-of-use, GUIs often work well for relatively simple use cases, such as a use creating a small number of entities on performing a small number of operations in the containerized cluster. However, GUIs can be less useful for more complex use cases. For example, a containerized cluster operation may have some parameters that are not frequently used, and the GUI may lack input fields for those parameters. Thus, a GUI may lack support for certain operations of the containerized cluster. As another example, determining input values for forms at runtime can be difficult using a GUI. Further, dynamic or repetitive operations can be difficult to perform using a GUI.

A containerized cluster can have a Command Line Interface ("CLI"), which is ordinarily provided as a separate alternative to a GUI. The CLI accepts input in the form of command text, which can include shell commands and/or configuration files. The user is expected to provide the command text to use to perform particular tasks. The GUI provides little guidance as to the commands that are available and the parameters that can be specified for those commands. Thus, the CLI can be substantially more difficult to learn to use than the GUI. However, the relatively unstructured nature of the CLI provides flexibility. For example, the CLI be used by other programs such as shell scripts to control the containerized cluster. Since CLI commands can be specified as text, the commands can be stored in a file or data store and used repeatedly. Parameter values can be determined by a program such as a shell script or other program, and provided to the CLI as text. Further, the CLI can generally perform a wider range of operations than the GUI. For example, a CLI is likely to support operations that are not supported by the GUI, such as rarely-used operations since ease-of-use is emphasized in the GUI, operations or parameters that are used less often are that may be omitted from the GUI. Thus, the CLI is generally more flexible and efficient to use, but is more difficult to use than the GUI. The difficulty of using a GUI can be a major impediment to its use.

Aspects of the present disclosure address the above-noted and other deficiencies by providing a hybrid containerized cluster user interface that includes a Graphical User Interface that can be synchronized with a Command Line Interface. In response to user input that changes a value in the GUI, the hybrid user interface can update the corresponding command text displayed in the CLI to include the new value. The hybrid UI can also provide an indication of the portion of the CLI text that has been updated, e.g., by displaying the updated portion of the command in an emphasized format. In this way, the user can see the portion of the command or configuration text that corresponds to the input field in which the user provided the value. The GUI and the CLI can be displayed side-by-side so that the user can see the correspondence between the value of the input field in the GUI and the content of the command text. The hybrid user interface can generate or update the command text without performing the command in the containerized cluster, so the user can see the change to the command text without affecting the state of the containerized cluster.

Further, in response to receiving text in the CLI specifying a value of a parameter, the hybrid UI can update a corresponding form field of the GUI to have the same value specified in the text. The hybrid UI can also provide an indication of the corresponding form field, e.g., by displaying the form that contains the form field and emphasizing or otherwise indicating the form field including the name of the field and the updated value. Thus, the user can see which of the form fields corresponds to a particular portion (e.g., parameter name and value) of text in the CLI. Displaying the correspondence in this way can help a user who is unfamiliar with the particular parameter in the command or configuration to determine the meaning or purpose of the particular parameter, since the corresponding GUI form field provides a description or meaningful name, and the GUI also shows information about the operation associated with the parameter, including the operation's name and other parameters.

Further, the hybrid UI can perform verification of the text received in the CLI. For example, the hybrid UI can verify that the text in the GLI includes a valid value for each required form field of the operations currently selected in the GUI, according to a scheme that specifies the types and validly constraints for the selected operation's form fields (or parameter). If any of the values in the command or configuration are invalid, the hybrid UI can present as indicators of the invalid fields, e.g., by displaying the invalid value in the corresponding form field in emphasized text with an indication that the value in the GLI is invalid and is not accepted.

The hybrid UI can provide an indication of portions of the GLI text that specify parameters or operations not supported by the GUI. If the GLI text specifies a parameter that is not supported by the GUI, the hybrid UI can present a message indicating that the CLI text contains a parameter not displayable in the GUI. The hybrid UI can provide a bottom or other input feature that the use can select to cause the hybrid UI for indicate the portion of the CLI text that specifies the unsupported parameter, e.g., by emphasizing the portion.

If a parameter of an operation is not supported by the GUI (e.g., not implemented in the GUI), the hybrid UI can generate form fields in the GUI for the unsupported operation or parameters. The hybrid UI can generate the form and/or fields using a schema associated with the operation, or, alternatively, using the information specified in the CLI text (e.g., the name and value of the parameter in the CLI text). The hybrid UI can provide a button or other selectable feature having a label such as "translate to GUI from CLI" which causes the hybrid UI to generate form fields in the GUI for unsupported parameters.

The systems and methods described herein include technical improvements to a computing environment. In particular, aspects of the present disclosure may enhance the performance of a computing system by translating commands between a command-line text format and a graphical interface format. Various aspects of the above referenced methods and systems are described in details herein below by way of examples, rather than by way of limitation.

FIG. 1 depicts a high-level block diagram of an example computing environment 100 that includes a cluster management user interface 154, in accordance with one or more aspects of the present disclosure. The computing environment 100 can provide cluster management services that include creating, executing, and managing applications on a containerized computing cluster 150 ("containerized cluster"). The containerized cluster 150 can operate in accordance with instructions provided by the cluster management user interface 154. Users, such as computer program developer team members, system administrators, development operations team members, and so on, can use a cluster management user interface 154 to perform operations on the containerized cluster 150, such as creating and managing applications and infrastructure used by the applications.

Cluster management user interface 154 may be a web application, a desktop application, a browser application, etc. Cluster management user interface 154 may be located on a client machine 111 and may interact with the containerized cluster 150 via a containerized cluster API 152 through a network 105. The communication between the user interface 154 and the containerized cluster 150 may be, e.g., inter-machine network communication connections (e.g., as in the case of network 105) or intra-machine communication (not shown).

A client machine 111 can be a computing device such as a server computer, a desktop computer, a set-top box, a gaming console, a television, a portable computing device such as, and not limited to, mobile telephones, personal digital assistants (PDAs), portable media players, netbooks, laptop computers, an electronic book reader and the like. The network 105 can be a private network (e.g., a local area network (LAN), a wide area network (WAN), intranet, or other similar private networks) or a public network (e.g., the Internet).

An application can be, for example, a web application, a desktop application, a browser application, etc. An application can be a messaging application, a video application, a social networking application, video sharing application, photo sharing application, chat application, mobile application of a content provider or any combination of such applications. An application can be a computationally large or data-intensive application, such as a forecasting application, a modeling application, a data analysis application, etc.

Applications can be developed using containers that handle infrastructure-related tasks such as deployment of applications for operation. A container may include the application and the application's dependencies, such as libraries and configuration information. The term "containerized application" may refer to a container that contains the application and the application's dependences. A containerized application may be run on a host computer system that has a suitable operating system and runtime engine. Container computing platforms can automate container operations, such as deploying, managing, and scaling containerized applications. For example, a container computing platform may schedule and run containers on clusters of physical or virtual machines and provide system management tools to simplify the administration of the clusters. The term "containerized cluster" may refer to a cluster that may run containerized applications using a container computing platform. A containerized cluster 150 may represent a set of host computing devices and associated resources such as storage devices. The containerized cluster 150 may include virtual and physical resources, which may be represented in the containerized cluster as cluster entities 156. The cluster entities 156 may include virtual machines, cluster nodes, persistent volumes, virtual networks, and so on. The KUBERNETES platform is an example of a container computing platform. The containerized cluster(s) 150 on which the container computing platform runs may be accessible via a network such as the Internet, and may be provided as cloud services. Thus, the cluster entities 156 may execute in a cloud environment.

As depicted in FIG. 1, a computing environment 100 includes the containerized cluster 150. The containerized cluster 150 may include one or more compute nodes 154 and one or more containerized cluster entities 156. The cluster entities 156 may include a virtual machine entity 158, a node entity 160 (which may represent compute nodes 154), a persistent volume claim entity 162 (which may represent persistent storage), a storage class entity 164, a network entity 166, and a virtual machine template entity 168 (which may represent a template for creating virtual machines 158).

Although not shown, there may be multiple containerized clusters 150, multiple nodes 154, and multiple cluster entities 156 of each type (e.g., another virtual machine entity 158), or cluster entities of other types (e.g., to represent other types of virtual or physical resources, such as a persistent volume).

FIG. 2A depicts an example user interface 200 of a cluster management tool showing a change in a form field of a GUI 202, and a consequent change in a corresponding mapped parameter of a text command of a CLI 220, in accordance with one or more aspects of the present disclosure. The cluster management user interface 200 can correspond to the cluster management user interface 154 of FIG. 1, for example.

The cluster management user interface 200A includes a GUI 202, which presents one or more form fields in which values can be entered, and a command-line interface 220, which presents one or more editable text fields 224 in which command text can be entered and displayed. The GUI 202 displays a name of an operation 204 ("Create Virtual Machine") that can be performed on a containerized cluster 150. The values of the form fields can be provided as input to the operation 204 performed on the containerized cluster. The form fields include a "Virtual machine name" field and a "Virtual machine template" field. Each form field includes a field name and a field value. Thus, the "Virtual machine name" form field includes the field name "Virtual machine name" 206 and the field value "vm-name-01" 208. The "Virtual machine name" form field is a text input field, in which the user can enter a name in a text string format. Further, the "Virtual machine template" form field includes the field name "Virtual machine template" name 210 and the field value "RHEL 8" 212. The "Virtual machine template" form field is a drop-down field, from which the user can select one of a set of options.

The Create Virtual Machine operation 204 and the form field values 208, 212 can be submitted to the containerized cluster 150 in an operation request in response to a user selecting a "Create virtual machine" button 214. In one example, the user interface 200 submits the command text 226 generated from the GUI 202 to the containerized cluster in response to the user selecting the "Create virtual machine" button 214. In another example, the user interface 200A can close the GUI 202 and CLI 220 in response to a user selecting a "Cancel" button 216.

Although a particular operation and particular parameters are described in this example, any suitable operation and parameters can be presented and processed by the GUI 202. For example, other operations of the containerized cluster 150, such as "Import Virtual Machine," "Create Application," "Create Node," and so on, can be presented and processed in the GUI 202.

The CLI 220 presents a text editor field 224 that receives and displays command text 226. The CLI 220 can be displayed in response to the user selecting a CLI button or link 218, for example. The command text 226 can be executed by the containerized cluster 150 to perform an operations as specified by the command text. The command text can correspond to (e.g., specify) the same operation specified in the GUI 202. The user interface 200 can synchronize the GUI 202 and the CLI 220 by updating the command text 226 in the CLI 220 to reflect changes made (e.g., by a user) to the form fields of the GUI 202 and/or updating the operation 204 and/or form fields of the GUI to reflect changes made (e.g., by a user) to the command text 226 in the CLI 220.

A user can enter or modify the command text 226, e.g., by editing existing text or pasting new text that replaces the existing text. Default or initial command text can be generated by the user interface 200 based on the values of the form fields of the GUI 202 and included in the text editor field 224. The user interface 200 can update the command text to reflect changes to the operation 204 (e.g., selection of a different operation) and/or one or more of the form fields of the GUI 202.

The example command text 226 ("oc create -f rhel-8-vm.yaml") is in a shell command format and specifies an operation that creates a virtual machine ("oc create") and parameters that specify a configuration file for the operation ("–f rhel-8-vm.yaml"). The CLI 220 can include multiple user interface tabs, each of which corresponds to different command text. The command text 226 is shown in a "Terminal" tab 222. Different command text that represents the contents of the configuration file ("rhel-8-vm.yaml") can be presented in the text input field 224 in response to the user selecting a YAML tab 232. One of more of the command texts (e.g., from one or more respective tabs) can be submitted to the containerized cluster 150 to perform an operation. For example, in response to a user selecting the "Create virtual machine" button 214, the user interface 200 can submit the command text from the Terminal tab 222 and the command text from the YAML tab 232 in an operation request to the containerized cluster 150.

As an example, if a user changes the "Virtual machine template" field to "RHEL 7" 213 by selecting "RHEL 7" from the drop-down list associated with the field, the user interface 200B is presented. In the user interface 200B, the "Virtual machine template" field has the value "RHEL 7" 213 as a result of the user selecting "RHEL 7." The user interface 200B detects the change to the "Virtual machine template" form field and changes the corresponding parameter in the Terminal tab 220 from "rhel-8-vm.yaml" to "rhel-7-vm.yaml". The user interface 200B can use a mapping between form fields and command parameters to identify the parameter of the command text 226 that corresponds to the updated form field. The mapping in this example specifies that the "Virtual machine template" form field corresponds to the fourth parameter of the command text 226 of the Terminal tab 222. The user interface 200B can use a transformation associated with the mapping to determine an updated value of the fourth parameter. In this example, the transformation is associated with a transformation specification, which specifies that form field values of the format "RHEL N" are transformed to parameter values of the form "rhel-N-vm.yaml" where N is a number.

As another example, a user change to the virtual machine configuration filename "rhel-8-vm.yaml" in the command text 226 can cause the user interface 200B to update the "Virtual machine template" form field value 213 accordingly. If the user changes the command text 226 to the command text 227 by replacing "8" with "7" using the text editor field 224, the user interface 200B detects the change to the command text and determines which parameter has changed. Since the fourth parameter has changed, the user interface 200B uses the mapping between form fields and command parameters to identify the form field that corresponds to the fourth parameter of the command text 226. As described above, the mapping in this example specifies that the "Virtual machine template" form field corresponds to the fourth parameter of the command text 226. The user interface 200B can use a transformation associated with the mapping to determine an updated value of the "Virtual machine template" form field. As described above, the transformation specifies that form field values of the format "RHEL N" are transformed to parameter values of the form "rhel-N-vm.yaml" where N is a number. Although a particular operation and particular parameters are described in this example, any suitable operation and parameters can be presented and processed by the CLI 220.

FIG. 2B depicts an example user interface 201 of a cluster management tool showing a change in a parameter of a text command of a CLI 220, and a consequent change in a corresponding mapped form field of a GUI 202, in accordance with one or more aspects of the present disclosure. In user interface 201A, command text 230 is shown in a "YAML" tab 232 of CLI 220. In this example the command text 230 is a representation of the content of a configuration file that is used by another command shown in the Terminal tab, as described above with respect to FIG. 2A. The command text 230 includes a sequence of parameters, which correspond to name-value pairs in the YAML format. The first two parameters ("apiVersion: kubevirtio/v1" and "kind: VirtualMachine") specify that the command text 230 performs an operation that creates a virtual machine (VM). The command text 230 also includes a VM name parameter ("vmName: vm-name-01") which has a parameter name portion ("vmName") and a parameter value portion ("vm-name-01"). The VM name parameter is indented and below the "metadata" label, which indicates that the VM name parameter is in a scope named "metadata." Thus, the fully-scoped parameter name of the VM name parameter is "metadata.vmName."

As an example, if a user changes the value of the VM name parameter from "vm-name-01" to "vm-name-02", e.g., by editing the command text 230 in the text editor field 224, the user interface 201B is presented. In the user interface 201B, the VM name parameter has the value "vm-name-02" as a result of the user editing the command text 230. The user interface 201B detects the change to the command text 230 and determines which parameter has changed. By comparing the updated text 231 to the original text 230, the user interface 201B identifies the difference in the VM name parameter, and thus determines that the VM name parameter has changed. Since the VM name parameter has changed, the user interface 201B uses a mapping between form fields and command parameters to identify the form field that corresponds to the VM name parameter of the command text 231. In this example, the table shown in FIG. 3 can be used to identify the form field that corresponds to the VM name parameter ("metadata.vmName") by searching the table for a row (e.g., a record) that has a Text Parameter Name 308 equal to "metadata.vmName". The first row of the table has a text parameter name of "metadata.vmName" and thus can be used to identify the form field name. The form field name is given by the GUI Form Field Name column 306. In this example, since the first row has a matching text parameter name 308, the form field name is given by the value of the GUI Form Field Name column 306 in the first row, which is "vmname". Thus, the mapping in this example specifies that the form field named "vmname" (which has the description 304 "Virtual machine name") corresponds to the VM name parameter ("metadata-.vmName"). The user interface 201B can update the value 208 of the "vmname" form field to be the same as the value of the updated VM name parameter in the command text ("vm-name-02"). The updated value 209 of the "vmname" form field is shown as "vm-name-02" in user interface 201B.

As another example, a user change to the "Virtual machine name" form field can cause the user interface 201B to update the VM name parameter in the command text 230 to the new value. For example, if the user changes the value of the "Virtual machine name" form field to "vm-name-02"), then the user interface 201B detects the change to the "Virtual machine name" form field and changes the VM name parameter in the command text 230 to "vm-name-02" to produce the command text 231. The user interface 200B can use the mapping between form fields and command parameters to identify the parameter of the command text 230 that corresponds to the updated form field. As described above, the mapping in this example specifies that the "Virtual machine name" form field corresponds to the VM name parameter ("metadata.vmName") of the command text 230. The user interface 200B can copy the updated value of the "Virtual machine name" form field ("vm-name-02") to the "vmName" parameter of the command text 231, thereby replacing the previous value ("vm-name-01").

Figure 2C:
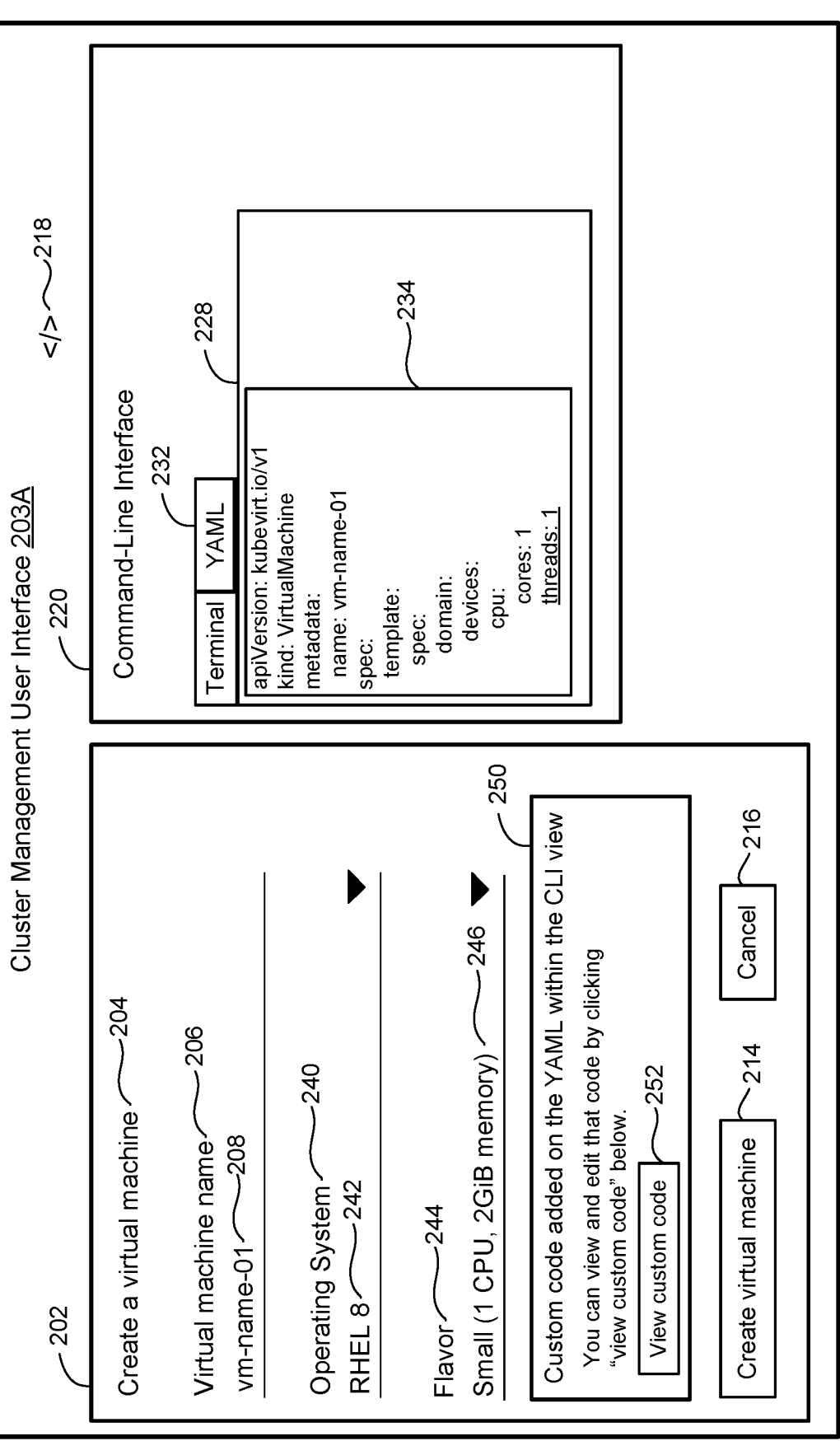
FIG. 2C depicts an example user interface of a cluster management tool showing addition of parameter to a text command of a CLI, and a consequent indication that there is no corresponding mapped form field in a GUI, in accordance with one or more aspects of the present disclosure.

FIG. 2C depicts an example user interface 203 of a cluster management tool showing addition of parameter to a text command of a CLI 220, and a consequent indication 250 that there is no corresponding mapped form field in a GUI, in accordance with one or more aspects of the present disclosure. In response to a user adding a parameter to command text 234 in a text editor field 228, the user interface 203A can attempt to identify a form field that corresponds to the parameter name. To identify the form field, the user interface 203A can identify a form field name associated with the textual parameter name by a mapping data structure such as the mapping table 300 of FIG. 3. The user interface 203A can then determine whether the user interface 203A (e.g., the GUI 202) includes a form field having the form field name. If the user interface 203A has such a form field, then the user interface 203 can update the form field value, e.g., as described above. Otherwise, the user interface 203A does not have a form field that corresponds to the parameter name, and the user interface 203A can perform an appropriate action. This condition can occur if, for example, the user interface 203A does not implement a form field that corresponds to the parameter name. In other words, the parameter name is not supported by the GUI 202. The appropriate action can be, for example, presenting a notification 250 indicating that the "custom code" has been added to the command text (e.g., YAML) in the CLI 220. The notification 250 can further include a "View custom code" button 250, which the user can select to cause the text editing field 228 to present (e.g., scroll to and/or emphasize) the portion of the command text 234 that includes the unsupported parameter name.

As an example, as shown in the text editor field 228 of the CLI 220 in user interface 203A, a user has added the parameter "threads: 1" to the command text 234. The user interface 203A attempts to identify a form field that corresponds to the parameter name "threads" using a mapping data structure. However, there is no record in the mapping data structure for the parameter name "threads". Thus, the GUI 202 does not include a form field corresponding to the "threads" parameter. Accordingly, the user interface 203A presents the "custom code added" notification 250. In response to a user selecting (e.g., clicking on) the "View custom code" button 252, the user interface 203 can indicate the portion of the text command that includes the parameter unsupported by a GUI, as shown in FIG. 2D.

Figure 2D:
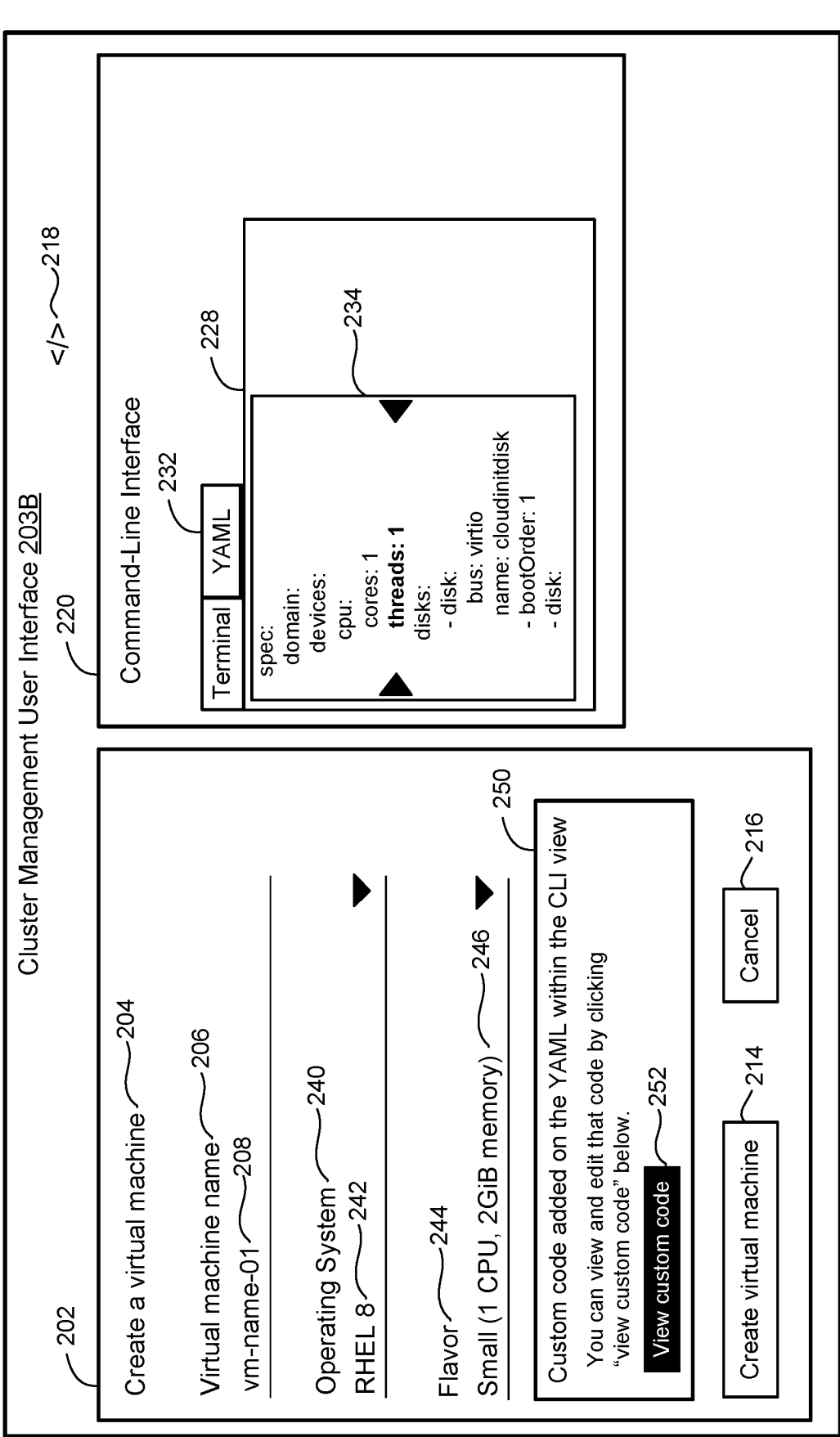
FIG. 2D depicts an example user interface that indicates a portion of a text command that includes a parameter unsupported by a GUI, in accordance with one or more aspects of the present disclosure.

FIG. 2D depicts an example user interface that indicates a portion of a text command that includes a parameter unsupported by a GUI, in accordance with one or more aspects of the present disclosure. In response to the user clicking the "View custom code" button 252, the user interface 203 scrolls the text editor field 228 so that the "threads:1" parameter is visible (e.g., displayed) and/or emphasized (e.g., displayed as bold text, indicated by an arrow, or otherwise highlighted). The "View custom code" button 252 may include a link to the portion of the command text 234 (e.g., line number or tagged location) at which the parameter "threads: 1" is located.

Figure 2E:
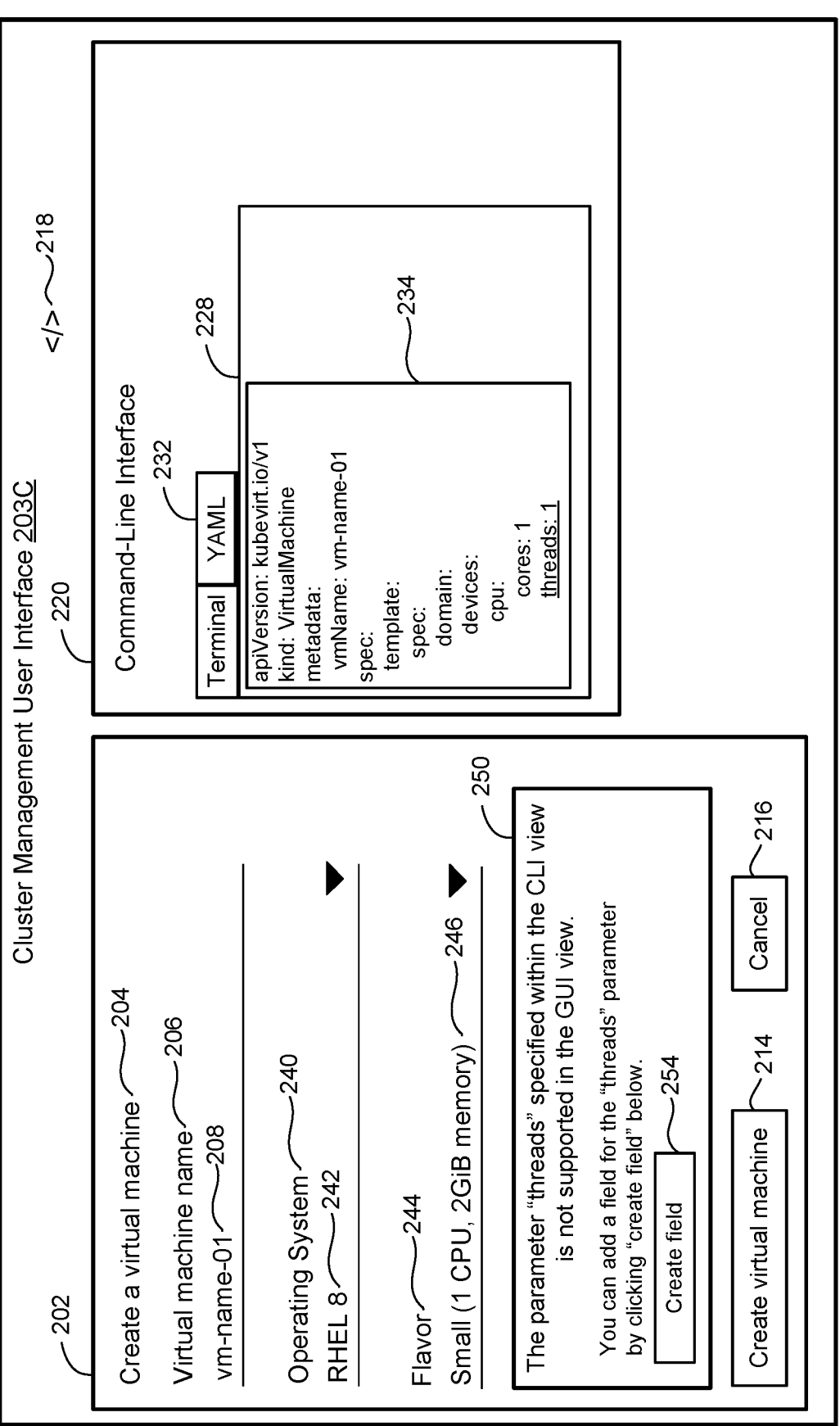
FIG. 2E depicts an example user interface of a cluster management tool showing addition of a parameter to a text command of a CLI, and a consequent creation of a corresponding mapped form field in a GUI, in accordance with one or more aspects of the present disclosure.

FIG. 2E depicts an example user interface 203B of a cluster management tool showing addition of a parameter to a text command 234 of a CLI 202. As described above with respect to FIG. 2C, it is possible that one or more parameters specified in the command text 234 of the CLI 220 do not have corresponding form fields in the GUI 202, e.g., because the GUI 202 does not implement corresponding form fields. If the user interface 203 determines that a particular parameter specified in the command text 234 does not have a corresponding form field, then the user interface 203 can create a corresponding form field from information specified by or corresponding to the particular parameter. The user interface 203 can query the user as to whether to create the form field. For example, the user interface 203 can present a notification 250 stating that the particular parameter specified in the CLI view (e.g., the "threads" parameter) is not supported in the GUI view. The notification 250 can request permission from the user to create a form field that corresponds to the particular parameter. If the user selects (e.g., clicks) a "Create field" button 254, then the user interface 203 can create the corresponding form field as described below.

Figure 2F:
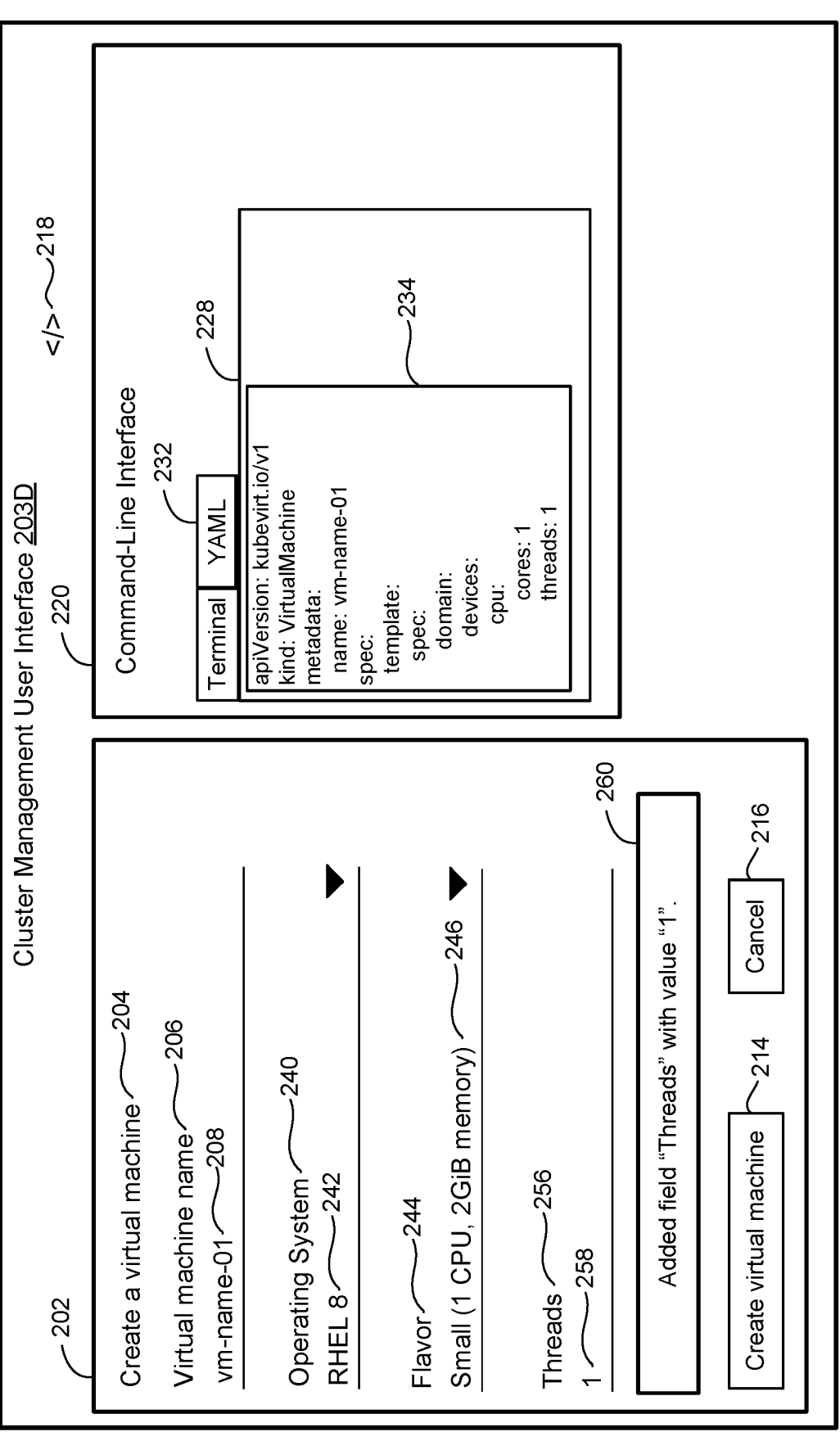
FIG. 2F depicts an example user interface of the cluster management tool showing creation of a mapped form field in a GUI, in accordance with one or more aspects of the present disclosure.

FIG. 2F depicts an example user interface 203C of the cluster management tool showing creation of a mapped form field in a GUI, in accordance with one or more aspects of the present disclosure. To create the corresponding form field, the user interface 203 can determine a form field name 256 and form field value 258 using the parameter name and parameter value. In one example, the user interface 203 can copy the parameter name (e.g., "threads") to the form field name 256, and copy the parameter value (e.g., 1) to the form field value 258. In another example, the user interface 203 can use a schema associated with the command text 234 to identify a schema record that describes the parameter. The schema can be, for example, an Open API schema provided by the containerized cluster 150 for the command text (e.g., for text in YAML format). The schema can include a schema record for each operation, and a schema record for each parameter of the operation. Each schema record for a parameter can include the name of the parameter, a description of the parameter, and a type of the parameter. The type can be, e.g., string, integer, Boolean, or other primitive type, or a schema. The user interface can create a form field having a field name determined (e.g., copied) from the parameter name of the text command and a data type determined from the type of the parameter. As shown in FIG. 2F, the user interface 203 creates a form field having name "Threads" 256, value "1" 258, and type "integer". The user interface 203 can display a notification 260 indicating that a field named "Threads" 256 and having value "1" 258 has been created in the GUI 202.

In some embodiments, the user interface 203 can validate that the text command 234 corresponds to its associated schema. The user interface 203 can validate the text command 234 by identifying a data schema associated with the operation (which is "Create Virtual Machine" in this example, as specified by the "kind: VirtualMachine" parameter in the command text 234. The data schema includes one or more schema elements, and each schema element specifies a name and data type of a parameter of the operation. The user interface 203 can identify, in the data schema, a schema element that corresponds to the textual parameter. For example, the schema may include a schema element that corresponds to the metadata.vmName parameter and specifies that the metadata.vmName parameter has a string data type and a description "Virtual machine name". The user interface 203 can determine whether the parameter value (e.g., "vm-name-01") is valid according to a data type specified by the schema element. In this example, "vm-name-01" is a string, and thus conforms to the string data type associated with the metadata.vmName parameter. If each parameter in the command text 234 is determined to be valid according to the schema, then the command text 234 is valid. Otherwise, the command test 234 is not valid according to the schema, and the validation fails. A notification of the validation result (e.g., success or failure) can be presented in the user interface 203.

FIG. 3 depicts an example mapping table 300 representing a mapping between graphical and textual representations of a command that creates a virtual machine, in accordance with one or more aspects of the present disclosure. The mapping table 300 has three columns: a GUI form field description 304, a GUI form field name 306, and a text parameter name 308. Each row of the mapping table includes a value for each column, and represents an association between the three values. The GUI form field description 304 is a description of a form field and can be displayed in the GUI. The GUI form field name 306 is a name that can be used to identify the form field. The text parameter name is a name that can be used to identify a text parameter. Thus, each row of the table associates a GUI form field with a CLI text parameter. The first row includes the values "Virtual Machine Name" and "vmname for the GUI form field description and GUI form field name, respectively. The first row also includes the text parameter name "metadata.name". Thus, the first row associates the virtual machine field name "vmname" with the text parameter name "metadata.name". Similarly, the second row associates the Operating system field name "os" with the parameter name "annotations.name.os". The third row associates the Boot Source field name "boot-src" with the text parameter name "spec.source.http". The fourth row associates the Flavor field name "flavor" with the text parameter name "spec.template.metadata.annotations.vm/flavor." The fifth row associates the Workload Type field name "workload" with the text parameter name "spec.template.metadata.annotations.vm/workload." The sixth row associates the Start VM field name "start-vm" with the text parameter name "spec.running." The mapping table 300 can be used to identify the text parameter name that corresponds to a given GUI form field name, and vice versa.

FIG. 4 depicts a flow diagram of an example method 400 for determining a value of a form field based on a corresponding mapped parameter of a text command, in accordance with one or more aspects of the present disclosure.

Method 400 and each of its individual functions, routines, subroutines, or operations may be performed by one or more processors of the computer device executing the method. In certain implementations, method 400 may be performed by a single processing thread. Alternatively, method 400 may be performed by two or more processing threads, each thread executing one or more individual functions, routines, subroutines, or operations of the method. In an illustrative example, the processing threads implementing method 400 may be synchronized (e.g., using semaphores, critical sections, and/or other thread synchronization mechanisms). Alternatively, the processes implementing method 400 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 400 may be performed by a cluster management user interface 154 as shown in FIG. 1 or by an executable code of a host machine (e.g., host operating system or firmware), a virtual machine (e.g., guest operating system or virtual firmware), an external device (e.g., a PCI device), other executable code, or a combination thereof.

Method 400 may be performed by processing devices of a server device or a client device and may begin at block 410. At block 410, a host computer system may receive, via a text input component of a containerized cluster user interface, text that includes an operation name that identifies a containerized cluster operation, wherein the text further includes a textual parameter name and a textual parameter value.

At block 420, the host computer system may identify a form field name that corresponds to the textual parameter name, wherein the form field is identified using a mapping data structure associated with the containerized cluster operation, wherein the mapping data structure comprises one or more mappings, and each of the mappings associates a particular field name with a corresponding particular parameter name. The host computer system may identify the form field that corresponds to the textual parameter name by identifying, in the mapping data structure, a mapping in which the particular parameter name included in the mapping corresponds to the textual parameter name, wherein the identified form field name is the particular field name included in the identified mapping. The mappings may be, e.g., records, and the data structure may be, e.g., a hash table list of records. Identifying the mapping may involve searching the data structure for a mapping having a particular parameter name that matches the textual parameter name.

At block 430, the host computer system may generate a form field value in view of the textual parameter value. For example, the host computer system may set the form field value to the textual parameter value, or convert the form field value to value in string format, and set the form field value to the string. At block 440, the host computer system may present, e.g., display, the form field value in the form field. Responsive to completing the operations described herein above with references to block 440, the method may terminate.

FIG. 5 depicts a flow diagram of an example method 500 for generating command text that includes a parameter based on a corresponding value of a mapped form field, in accordance with one or more aspects of the present disclosure.

Method 500 and each of its individual functions, routines, subroutines, or operations may be performed by one or more processors of the computer device executing the method. In certain implementations, method 500 may be performed by a single processing thread. Alternatively, method 500 may be performed by two or more processing threads, each thread executing one or more individual functions, routines, subroutines, or operations of the method. In an illustrative example, the processing threads implementing method 500 may be synchronized (e.g., using semaphores, critical sections, and/or other thread synchronization mechanisms). Alternatively, the processes implementing method 500 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 500 may be performed by a cluster management user interface 154 as shown in FIG. 1 or by an executable code of a host machine (e.g., host operating system or firmware), a virtual machine (e.g., guest operating system or virtual firmware), an external device (e.g., a PCI device), other executable code, or a combination thereof.

Method 500 may be performed by processing devices of a server device or a client device and may begin at block 510. At block 510, a host computer system may receive, in a containerized cluster user interface, an operation name and one or more form fields, the operation name identifying an operation of a containerized cluster.

At block 520, the host computer system may generate command text comprising a plurality of parameters ordered in a sequence specified by a schema associated with the operation. At block 520, the host computer system may perform blocks 530, 540, 550, and 560 for each of the form fields.

At block 530, the host computer system may identify a textual parameter name that corresponds to the form field, wherein the corresponding textual parameter name is identified using a mapping data structure associated with the operation, wherein the mapping data structure comprises one or more mappings, and each of the mappings associates a particular field name with a corresponding particular parameter name. The host computer system may identify the textual parameter name that corresponds to the form field by identifying, in the mapping data structure, a mapping in which the particular field name included in the mapping corresponds to the form field, wherein the identified textual parameter name is the particular parameter name included in the identified mapping. The mappings may be, e.g., records, and the data structure may be, e.g., a hash table list of records. Identifying the mapping may involve searching the data structure for a mapping having a particular field name that matches a name of the form field. The name of the form field may be determined using an association between the form field name and the form field. The host computer system may maintain, e.g., in a data structure of the containerized cluster user interface, an association between each form field name and the corresponding form field.

At block 540, the host computer system may generate, in view of a value associated with the form field, a textual parameter value. For example, the host computer system may set the value of the textual parameter to have the same value as the form field. At block 550, the host computer system may generate parameter text that includes the textual parameter name and the textual parameter value. At block 560, the host computer system may include the parameter text in the command text at a location in the command text. The location is determined in view of the schema. For example, the schema specifies a sequence of parameters. The host computer system may identify the position of the parameter (for which text is being generated) in the schema. For example, the parameter may correspond to the third element in the sequence of elements specified by the schema. The host computer system may determine that the location of the command text is between the second and fourth elements, or after the second element, for example. At block 570, the host computer system may present the command text in a text presentation component of the containerized cluster user interface. Responsive to completing the operations described herein above with references to block 570, the method may terminate.

The host computer system may, responsive to receiving selection of an input component, send one or more commands comprising the command text to the containerized cluster. The host computer system may display each command sent to the containerized cluster; receive output generated by the containerized cluster for each command, and display the output generated by the containerized cluster. The output may include, for example, a configuration specification, an operation log, or both.

Figure 6A:
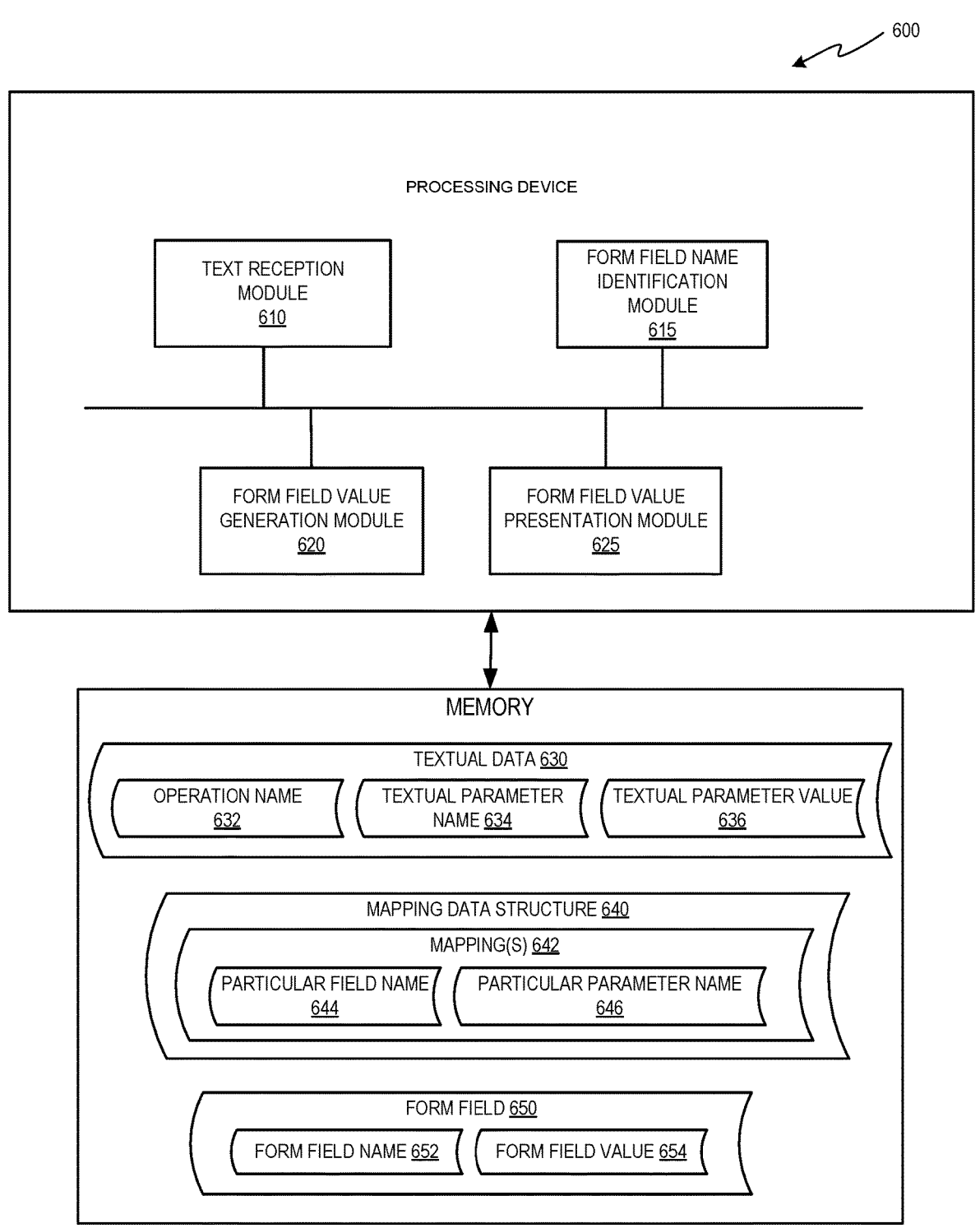
FIGS. 6A and 6B depict block diagrams of computer systems operating in accordance with one or more aspects of the present disclosure.

FIG. 6A depicts a block diagram of a computer system 600 operating in accordance with one or more aspects of the present disclosure. Computer system 600 may be the same or similar to client 111 or compute node(s) 154 of FIG. 1, and may include one or more processors and one or more memory devices. In the example shown, computer system 600 may include a text reception module 610, a form field identification module 615, a form field value generation module 620, and a form field value presentation module 625.

Text reception module 610 may enable a processor to receive, via a text input component of a containerized cluster user interface, textual data 630 that includes an operation name 632 identifying a containerized cluster operation. The textual data 630 further includes a textual parameter name 634 and a textual parameter value 636.

Form field name identification module 615 may enable the processor to identify a form field 652 that corresponds to the textual parameter name 634. The processor may identify the form field 650 using a mapping data structure 640 associated with the containerized cluster operation. The mapping data structure 640 includes one or more mappings 642, and each mapping 642 includes a particular field name 644 and a corresponding particular parameter name 646. Form field value generation module 620 may enable the processor to generate a form field value 654 from the textual parameter value. Form field value presentation module 625 may cause the processor to present the form field value in a form field 650 that is identified by the form field name 652. To identify the form field name 652 that corresponds to the textual parameter name 634, the processor may identify, in the mapping data structure 640, a mapping 642 in which the particular parameter name 646 included in the mapping 642 corresponds to the textual parameter name 634. The identified form field name 642 corresponds to the particular field name 644 included in the identified mapping 642.

Figure 6B:
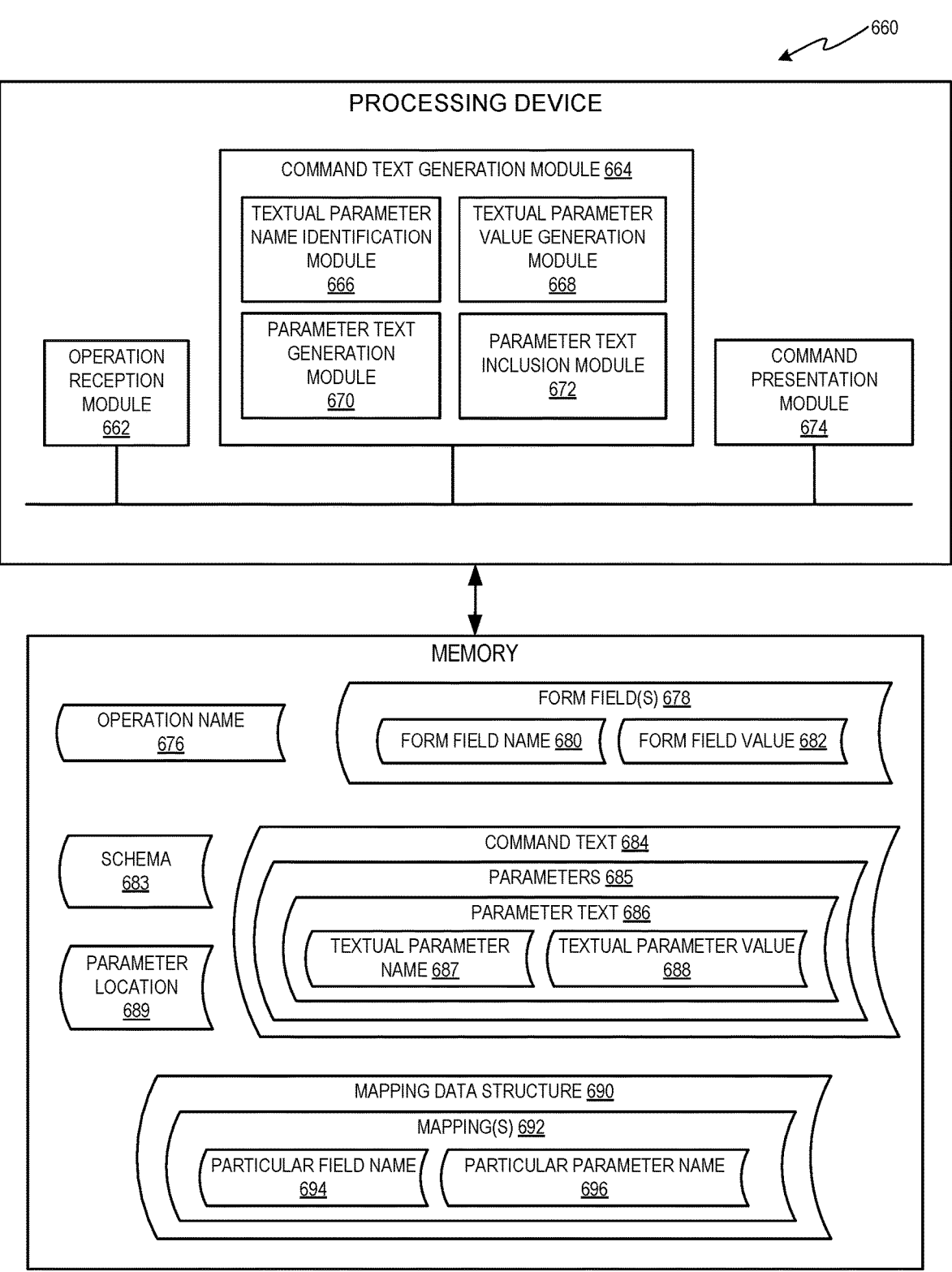

FIG. 6B depicts a block diagram of a computer system 660 operating in accordance with one or more aspects of the present disclosure. Computer system 660 may be the same or similar to client 111 or compute node(s) 154 of FIG. 1, and may include one or more processors and one or more memory devices. In the example shown, computer system 660 may include an operation reception module 662, a command text generation module 664, and a command presentation module 674. The command text generation module 664 may include a textual parameter name identification module 666, a textual parameter value generation module 668, a parameter text generation module 670, and a parameter text inclusion module 672.

Operation reception module 662 may enable a processor to receive, in a containerized cluster user interface, an operation name 676 and one or more form fields 678. The operation name 676 may identify an operation of a containerized cluster. Command text generation module 664 may enable the processor to generate command text 684 comprising a plurality of parameters 685 ordered in a sequence specified by a schema 683 associated with the operation by invoking textual parameter name identification module 666, textual parameter value generation module 668, parameter text generation module 670, and parameter text inclusion module 672 for each of the form fields 678. Command presentation module 674 may enable the processor to present the command text 684 in a text presentation component of the containerized cluster user interface.

Textual parameter name identification module 666 may enable the processor to identify a textual parameter name 687 that corresponds to the form field 678 by using a mapping data structure 690 associated with the operation. The mapping data structure 690 includes one or more mappings 692, and each of the mappings 692 associates a particular field name 694 with a corresponding particular parameter name 696. Textual parameter value generation module 668 may enable the processor to generate, from a value 682 associated with the form field 678, a textual parameter value 688. Parameter text generation module 670 may enable the processor to generate parameter text 686 that includes the textual parameter name 687 and the textual parameter value 688. Parameter text inclusion module 672 may enable the processor to include the parameter text 686 in the command text 684 at a location 689 in the command text. The location in the command text is determined in view of the schema 683.

Figure 7:
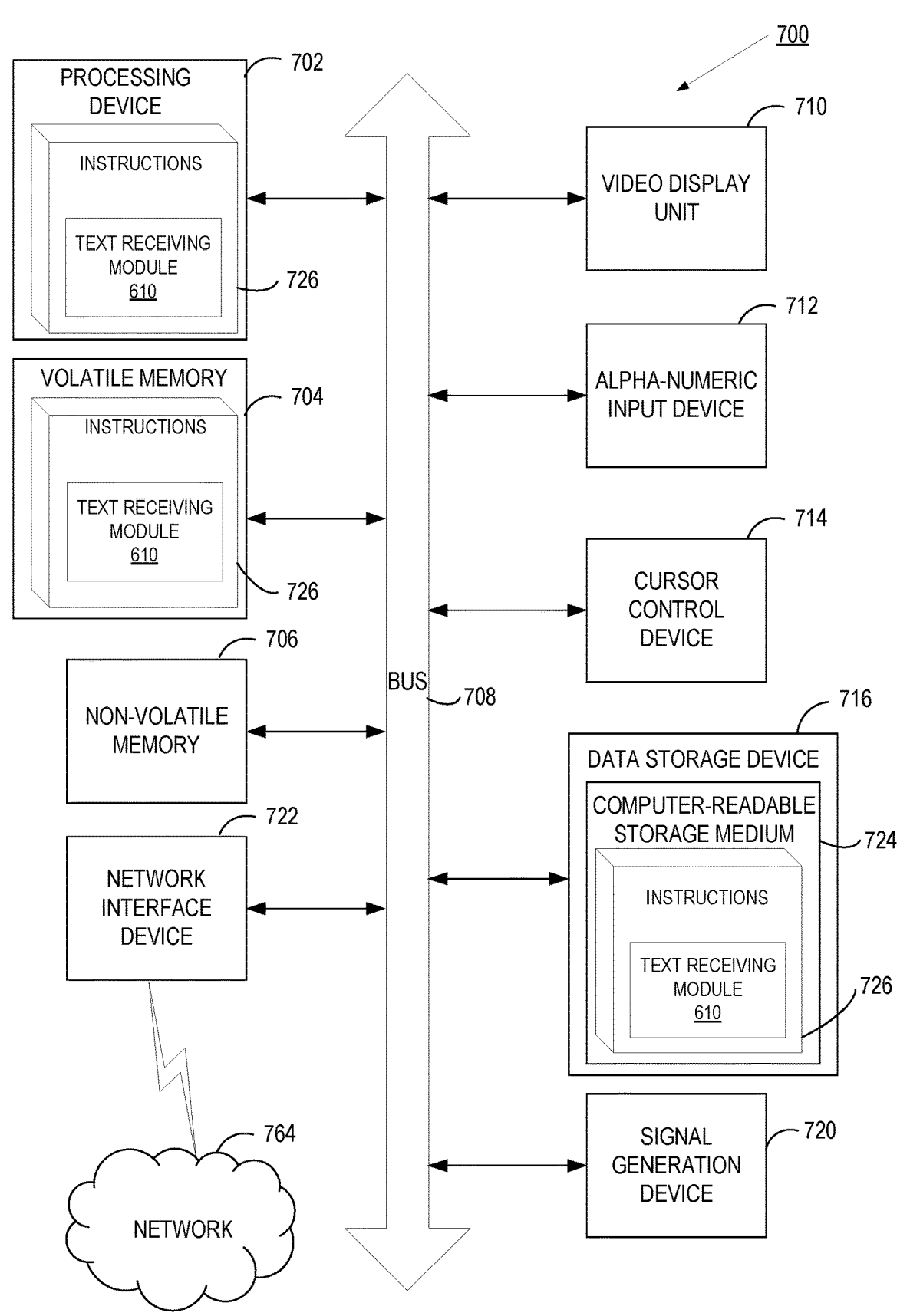
FIG. 7 depicts a block diagram of an example computer system operating in accordance with one or more aspects of the present disclosure.

FIG. 7 depicts a block diagram of a computer system operating in accordance with one or more aspects of the present disclosure. In various illustrative examples, computer system 700 may correspond to client 111 of FIG. 1. Computer system 700 may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical environment, but requests for a hard disk or memory may be managed by a virtualization layer of a computing device to translate these requests to the underlying physical computing hardware resources. This type of virtualization results in multiple VMs sharing physical resources.

In certain implementations, computer system 700 may be connected (e.g., via a network, such as a Local Area Network (LAN), an intranet, an extranet, or the Internet) to other computer systems. Computer system 700 may operate in the capacity of a server or a client computer in a client-server environment, or as a peer computer in a peer-to-peer or distributed network environment. Computer system 700 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 700 may include a processing device 702, a volatile memory 704 (e.g., random access memory (RAM)), a non-volatile memory 706 (e.g., read-only memory (ROM) or electrically-erasable programmable ROM (EEPROM)), and a data storage device 716, which may communicate with each other via a bus 708.

Processing device 702 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 700 may further include a network interface device 722. Computer system 700 also may include a video display unit 710 (e.g., an LCD), an alphanumeric input device 712 (e.g., a keyboard), a cursor control device 714 (e.g., a mouse), and a signal generation device 720.

Data storage device 716 may include a non-transitory computer-readable storage medium 724 on which may store instructions 726 encoding any one or more of the methods or functions described herein, including instructions for implementing method 400 or 500.

Instructions 726 may also reside, completely or partially, within volatile memory 704 and/or within processing device 702 during execution thereof by computer system 700, hence, volatile memory 704 and processing device 702 may also constitute machine-readable storage media.

While computer-readable storage medium 724 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

Other computer system designs and configurations may also be suitable to implement the system and methods described herein. The following examples illustrate various implementations in accordance with one or more aspects of the present disclosure.

Example 1 is a method comprising: receiving, via a text input component of a containerized cluster user interface of a computer system, text that includes an operation name that identifies a containerized cluster operation, wherein the text further includes a textual parameter name and a textual parameter value; identifying a form field name that corresponds to the textual parameter name, wherein the form field is identified using a mapping data structure associated with the containerized cluster operation, wherein the mapping data structure includes one or more mappings, and each mapping includes a particular field name and a corresponding particular parameter name; generating a form field value in view of the textual parameter value; and presenting the form field value in a form field identified by the form field name.

Example 2 is the method of example 1, wherein the form field value and the text in the text input component are simultaneously visible.

Example 3 is the method of example 1, wherein identifying the form field name that corresponds to the textual parameter name comprises: identifying, in the mapping data structure, a mapping in which the particular parameter name included in the mapping corresponds to the textual parameter name, wherein the identified form field name corresponds to the particular field name included in the identified mapping.

Example 4 is the method of example 1, wherein the form field identified by the form field name is identified using an association in the containerized cluster user interface between the form field name and the form field.

Example 5 is the method of example 1, wherein identifying the form field having the form field name comprises: determining whether the containerized cluster user interface includes a form field having the form field name associated with the textual parameter name; responsive to determining that the containerized cluster user interface does not include the form field, presenting, in the containerized cluster user interface, a parameter identification component; and responsive to selection of the parameter identification component, presenting, in the text input component, a portion of the text that includes the parameter name and the parameter value.

Example 6 is the method of example 5, wherein the parameter identification component comprises a selectable link to the portion of the text.

Example 7 is the method of example 1, further comprising: determining whether the containerized cluster user interface includes a form field having the form field name associated with the textual parameter name; responsive to determining that the containerized cluster user interface does not include the form field, generating, in view of the textual parameter, the form field; and adding the form field to the containerized cluster user interface.

Example 8 is the method of example 7, wherein generating, in view of the textual parameter, the form field comprises: identifying a data schema associated with the operation; identifying, in the data schema, a schema element that corresponds to the textual parameter; determining a name of the form field in view of the parameter name; and determining a data type of the form field in view of a data type specified by the schema element.

Example 9 is the method of example 7, wherein generating, in view of the textual parameter, the form field comprises: generating a name of the form field in view of the parameter name; and generating a data type of the form field in view of the parameter value.

Example 10 is the method of example 1, further comprising: validating the text input, wherein the validating comprises: identifying a data schema associated with the operation, wherein the data schema includes one more schema elements, and each schema element specifies a name and data type of a parameter of the operation; identifying, in the data schema, a schema element that corresponds to the textual parameter; and determining whether the parameter value is valid according to a data type specified by the schema element, wherein the text input is valid if the parameter value is valid.

Example 11 is the method of example 1, wherein generating the form field value in view of the textual parameter value comprises performing a transformation on the textual parameter value, wherein the transformation generates the form field value according to a transformation specification.

Example 12 is a system comprising: a memory; and a processing device communicably coupled to the memory, the processing device to: receive, in a containerized cluster user interface, an operation name and one or more form fields, wherein the operation name identifies an operation of a containerized cluster; generate command text comprising a plurality of parameters ordered in a sequence specified by a schema associated with the operation, wherein generating the command text comprises, for each of the form fields: identifying a textual parameter name that corresponds to the form field, wherein the corresponding textual parameter name is identified using a mapping data structure associated with the operation, wherein the mapping data structure includes one or more mappings, and each of the mappings associates a particular field name with a corresponding particular parameter name, generating, in view of a value associated with the form field, a textual parameter value, generating parameter text that includes the textual parameter name and the textual parameter value, and including the parameter text in the command text at a location in the command text, wherein the location in the command text is determined in view of the schema; and present the command text in a text presentation component of the containerized cluster user interface.

Example 13 is the system of example 12, wherein the form field value and the command text in the text presentation component are simultaneously visible.

Example 14 is the system of example 12, wherein to identify the textual parameter name that corresponds to the form field, the processing device is further to: identify, in the mapping data structure, a mapping in which the particular field name included in the mapping corresponds to a form field name of the form field, wherein the identified textual parameter name corresponds to the particular parameter name included in the identified mapping.

Example 15 is the system of example 12, wherein the operation name is associated with an input form component that includes the form field.

Example 16 is the system of example 12, wherein the command text comprises a shell command or a configuration specification for the operation.

Example 17 is the system of example 12, wherein the operation name is received in response to receiving input in at least one form field of the containerized cluster user interface.

Example 18 is the system of example 12, wherein the processing device is further to: responsive to receiving selection of an input component, send one or more commands comprising the command text to the containerized cluster.

Example 19 is the system of example 18, wherein the processing device is further to: display each command sent to the containerized cluster; receive output generated by the containerized cluster for each command; and display the output generated by the containerized cluster.

Example 20 is the system of example 19, wherein the output comprises one or more of a configuration specification or an operation log.

Example 21 is a non-transitory machine-readable storage medium storing instructions that cause a processing device to: receive, via a text input component of a containerized cluster user interface, text that includes an operation name that identifies a containerized cluster operation, wherein the text further includes a textual parameter name and a textual parameter value; identify a form field name that corresponds to the textual parameter name, wherein the form field is identified using a mapping data structure associated with the containerized cluster operation, wherein the mapping data structure comprises one or more mappings, and each of the mappings associates a form field name with a corresponding textual parameter name; identify a form field having the form field name; generate a form field value in view of the textual parameter value; and present the form field value in the form field.

Example 22 is the non-transitory machine-readable storage medium of example 21, wherein the form field value and the text in the text input component are simultaneously visible.

Example 23 is a method comprising: receiving, in a containerized cluster user interface of a computer system, an operation name and one or more form fields, wherein the operation name identifies an operation of a containerized cluster; generate command text comprising a plurality of parameters ordered in a sequence specified by a schema associated with the operation, wherein generating the command text comprises, for each of the form fields: identifying a textual parameter name that corresponds to the form field, wherein the corresponding textual parameter name is identified using a mapping data structure associated with the operation, wherein the mapping data structure includes one or more mappings, and each of the mappings associates a particular field name with a corresponding particular parameter name, generating, in view of a value associated with the form field, a textual parameter value, generating parameter text that includes the textual parameter name and the textual parameter value, and including the parameter text in the command text at a location in the command text, wherein the location in the command text is determined in view of the schema; and presenting the command text in a text presentation component of the containerized cluster user interface.

Example 24 is the method of example 23, wherein the form field value and the command text in the text presentation component are simultaneously visible.

Example 25 is the method of example 23, wherein identifying the textual parameter name that corresponds to the form field comprises: identifying, in the mapping data structure, a mapping in which the particular field name included in the mapping corresponds to a form field name of the form field, wherein the identified textual parameter name corresponds to the particular parameter name included in the identified mapping.

Example 26 is the method of example 23, wherein the operation name is associated with an input form component that includes the form field.

Example 27 is the method of example 23, wherein the command text comprises a shell command or a configuration specification for the operation.

Example 28 is the method of example 23, wherein the operation name is received in response to receiving input in at least one form field of the containerized cluster user interface.

Example 29 is the method of example 23, further comprising: responsive to receiving selection of an input component, sending one or more commands comprising the command text to the containerized cluster.

Example 30 is the method of example 29, further comprising: displaying each command sent to the containerized cluster; receiving output generated by the containerized cluster for each command; and displaying the output generated by the containerized cluster.

Example 31 is the method of example 30, wherein the output comprises one or more of a configuration specification or an operation log.

Example 32 is an apparatus comprising: a means for receiving, via a text input component of a containerized cluster user interface, text that includes an operation name that identifies a containerized cluster operation, wherein the text further includes a textual parameter name and a textual parameter value; a means for identifying a form field name that corresponds to the textual parameter name, wherein the form field is identified using a mapping data structure associated with the containerized cluster operation, wherein the mapping data structure includes one or more mappings, and each mapping includes a particular field name and a corresponding particular parameter name; a means for generating a form field value in view of the textual parameter value; and a means for presenting the form field value in a form field identified by the form field name.

Example 33 is the apparatus of example 32, wherein the form field value and the text in the text input component are simultaneously visible.

Example 34 is the apparatus of example 32, wherein the means for identifying the form field name that corresponds to the textual parameter name comprises: a means for identifying, in the mapping data structure, a mapping in which the particular parameter name included in the mapping corresponds to the textual parameter name, wherein the identified form field name corresponds to the particular field name included in the identified mapping.

Example 35 is the apparatus of example 32, wherein the form field identified by the form field name is identified using an association in the containerized cluster user interface between the form field name and the form field.

Example 36 is the apparatus of example 32, wherein the means for identifying the form field having the form field name comprises: a means for determining whether the containerized cluster user interface includes a form field having the form field name associated with the textual parameter name; a means for, responsive to determining that the containerized cluster user interface does not include the form field, presenting, in the containerized cluster user interface, a parameter identification component; and a means for, responsive to selection of the parameter identification component, presenting, in the text input component, a portion of the text that includes the parameter name and the parameter value.

Example 37 is the apparatus of example 36, wherein the parameter identification component comprises a selectable link to the portion of the text.

Example 38 is the apparatus of example 32, further comprising: a means for determining whether the containerized cluster user interface includes a form field having the form field name associated with the textual parameter name; a means for, responsive to determining that the containerized cluster user interface does not include the form field, generating, in view of the textual parameter, the form field; and a means for adding the form field to the containerized cluster user interface.

Example 39 is the apparatus of example 38, wherein generating, in view of the textual parameter, the form field comprises: a means for identifying a data schema associated with the operation; a means for identifying, in the data schema, a schema element that corresponds to the textual parameter; a means for determining a name of the form field in view of the parameter name; and a means for determining a data type of the form field in view of a data type specified by the schema element.

Example 40 is the apparatus of example 38, wherein generating, in view of the textual parameter, the form field comprises: a means for generating a name of the form field in view of the parameter name; and a means for generating a data type of the form field in view of the parameter value.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "determining," "deriving," "encrypting," "creating," "generating," "using," "accessing," "executing," "obtaining," "storing," "transmitting," "providing," "establishing," "receiving," "identifying," "initiating," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform method 400 or 500 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
receiving, via a Command Line Interface (CLI) component of a containerized cluster user interface of a computer system, first text that includes a first operation name that identifies a containerized cluster operation, wherein the first text further includes a first textual parameter name and a first textual parameter value;
validating the first text as corresponding to an associated schema and providing a validation result via a Graphical User Interface (GUI) component of the containerized cluster user interface;
accessing a mapping data table to determine if a mapping exists and retrieving, from the mapping data table associated with the containerized cluster operation, a first form field name based on the first textual parameter name, wherein the mapping data table includes one or more mappings, and each of the one or more mappings links a portion of the first text comprising a particular parameter name to a corresponding graphical representation of the containerized cluster operation indicated by a particular field name;
generating a first form field value in view of the first textual parameter value;
presenting, via the GUI component of the containerized cluster user interface, the first form field value in a first form field identified by the first form field name, wherein the CLI component and the GUI component are configured to synchronize the first text and the first form field value;
receiving, via the CLI component of the containerized cluster user interface, second text including a second textual parameter name and a second textual parameter value;
determining, using the mapping data table, whether the containerized cluster user interface includes a second form field having a second form field name corresponding to the second textual parameter name;
responsive to determining that the containerized cluster user interface does not include the second form field having the second form field name, presenting, in the containerized cluster user interface, a parameter identification component; and
receiving a selection of the parameter identification component and responsive to selection of the parameter identification component, presenting, in the CLI component, a portion of the second text that includes the second textual parameter name and the second textual parameter value.

2. The method of claim 1, wherein the first form field value and the first text that includes the first operation name are simultaneously visible.

3. The method of claim 1, wherein retrieving, from the mapping data table associated with the containerized cluster operation, the first form field name based on the first textual parameter name comprises:
identifying, in the mapping data table, a mapping in which the particular parameter name matches the first textual parameter name, wherein the retrieved first form field name corresponds to the particular field name included in the identified mapping.

4. The method of claim 1, wherein the first form field identified by the first form field name is identified using an association in the containerized cluster user interface between the first form field name and the first form field.

5. The method of claim 1, wherein the parameter identification component comprises a selectable link to the portion of the second text.

6. The method of claim 1, further comprising:

responsive to determining that the containerized cluster user interface does not include the second form field, generating, in view of the second textual parameter name, a second form field; and adding the second form field to the containerized cluster user interface.

7. The method of claim 6, wherein generating, in view of the second textual parameter name, the second form field comprises:

identifying a data schema associated with the containerized cluster operation;

identifying, in the data schema, a schema element that corresponds to the second textual parameter name;

determining a name of the second form field in view of the second textual parameter name; and determining a data type of the second form field in view of a data type specified by the schema element.

8. The method of claim 6, wherein generating, in view of the second textual parameter name, the second form field comprises:

generating a name of the second form field in view of the second textual parameter name; and generating a data type of the second form field in view of the second textual parameter value.

9. The method of claim 1, wherein validating the first text comprises:

identifying a data schema associated with the containerized cluster operation, wherein the data schema includes one more schema elements, and each schema element specifies a name and data type of a parameter of the containerized cluster operation;

identifying, in the data schema, a schema element that corresponds to the first textual parameter name; and determining whether the first textual parameter value is valid according to a data type specified by the schema element, wherein the first text is valid if the first textual parameter value is valid.

10. The method of claim 1, wherein generating the first form field value in view of the first textual parameter value comprises performing a transformation on the first textual parameter value, wherein the transformation generates the first form field value according to a transformation specification.

11. A system comprising:

a memory; and a processing device communicably coupled to the memory, the processing device to:

receive, in a Graphical User Interface (GUI) component of a containerized cluster user interface, a first operation name and one or more form fields, wherein the first operation name identifies an operation of a containerized cluster;

validate the first operation name as corresponding to an associated first schema and provide a validation result via the GUI component of the containerized cluster user interface;

generate command text comprising a plurality of parameters ordered in a sequence specified by a schema associated with the operation, wherein generating the command text comprises, for each of the form fields:

access a mapping data table to determine if a mapping exists and retrieve, from the mapping data table associated with the operation, a first textual parameter name based on a first form field, wherein the mapping data table includes one or more mappings, and each of the one or more mappings links a portion of the command text comprising one of the plurality of parameters to a corresponding graphical representation of the operation indicated by a particular field name, generate, in view of a value associated with the first form field, a first textual parameter value, generate parameter text that includes the first textual parameter name and the first textual parameter value, and including the parameter text in the command text at a location in the command text, wherein the location in the command text is determined in view of the schema;

present the command text in a Command Line Interface (CLI) component of the containerized cluster user interface, wherein the CLI component and the GUI component are configured to synchronize the command text and the value associated with the first form field;

receive, via the GUI component of the containerized cluster user interface, second text including a second textual parameter name and a second textual parameter value;

determine, using the mapping data table, whether the containerized cluster user interface includes a second form field having a second form field name corresponding to the second textual parameter name;

responsive to determining that the containerized cluster user interface does not include the second form field having the second form field name, present, in the containerized cluster user interface, a parameter identification component; and receive a selection of the parameter identification component and responsive to selection of the parameter identification component, presenting, in the CLI component, a portion of the second text that includes the second textual parameter name and the second textual parameter value.

12. The system of claim 11, wherein the value associated with the first form field and the command text in the text presentation component are simultaneously visible.

13. The system of claim 11, wherein to retrieve, from the mapping data table associated with operation, the first textual parameter name, the processing device is further to:

identify, in the mapping data table, a mapping in which the particular field name matches a first form field name of the first form field, wherein the retrieved first textual parameter name corresponds to the particular parameter name included in the identified mapping.

14. The system of claim 11, wherein the first operation name is received in response to receiving input in at least one form field of the containerized cluster user interface.

15. The system of claim 11, wherein the processing device is further to:

responsive to receiving selection of an input component, send one or more commands comprising the command text to the containerized cluster;

display each command sent to the containerized cluster;

receive output generated by the containerized cluster for each command; and display the output generated by the containerized cluster.

16. The system of claim 15, wherein the output comprises one or more of a configuration specification or an operation log.

17. A non-transitory machine-readable storage medium storing instructions that cause a processing device to:

receive, via a Command Line Interface (CLI) component of a containerized cluster user interface, first text that includes a first operation name that identifies a containerized cluster operation, wherein the first text further includes a first textual parameter name and a first textual parameter value;

validate the first text as corresponding to an associated schema and provide a validation result via a Graphical User Interface (GUI) component of the containerized cluster user interface;

access a mapping data table to determine if a mapping exists and retrieve, from the mapping data table associated with the containerized cluster operation, a first form field name based on the first textual parameter name, wherein the mapping data table comprises one or more mappings, and each of the of the one or more mappings links a portion of the first text comprising a particular parameter name to a corresponding graphical representation of the containerized cluster operation indicated by a particular field name;

identify a first form field having the first form field name;

generate a first form field value in view of the first textual parameter value;

present, via the GUI component of the containerized cluster user interface, the first form field value in the first form field, wherein the CLI component and the GUI component are configured to synchronize the first text and the first form field value;

receive, via the CLI component of the containerized cluster user interface, second text including a second textual parameter name and a second textual parameter value;

determine, using the mapping data table, whether the containerized cluster user interface includes a second form field having a second form field name corresponding to the second textual parameter name;

responsive to determining that the containerized cluster user interface does not include the second form field having the second form field name, present, in the containerized cluster user interface, a parameter identification component; and receive a selection of the parameter identification component and responsive to selection of the parameter identification component, presenting, in the CLI component, a portion of the second text that includes the second textual parameter name and the second textual parameter value.

18. The non-transitory machine-readable storage medium of claim 17, wherein the first form field value and the first text received via a text input component are simultaneously visible.

19. A method comprising:

receiving, in a Graphical User Interface (GUI) component of a containerized cluster user interface of a computer system, a first operation name and one or more form fields, wherein the first operation name identifies an operation of a containerized cluster;

validating the first operation name as corresponding to an associated first schema and providing a validation result via the GUI component of the containerized cluster user interface;

generate command text comprising a plurality of parameters ordered in a sequence specified by a schema associated with the operation, wherein generating the command text comprises, for each of the form fields:

accessing a mapping data table to determine if a mapping exists and retrieving, from the mapping data table associated with the containerized cluster operation, a first textual parameter name based on a first form field, wherein the mapping data table includes one or more mappings, and each of the one or more mappings links a portion of the command text comprising a particular parameter of the plurality of parameters to a corresponding graphical representation of the operation indicated by a particular field name, generating, in view of a value associated with the first form field, a first textual parameter value, generating parameter text that includes the first textual parameter name and the first textual parameter value, and including the parameter text in the command text at a location in the command text, wherein the location in the command text is determined in view of the schema;

presenting the command text in a Command Line Interface (CLI) component of the containerized cluster user interface, wherein the CLI component and the GUI component are configured to synchronize the command text and the value associated with the first form field;

receiving, via the GUI component of the containerized cluster user interface, second text including a second textual parameter name and a second textual parameter value;

determining, using the mapping data table, whether the containerized cluster user interface includes a second form field having a second form field name corresponding to the second textual parameter name;

responsive to determining that the containerized cluster user interface does not include the second form field having the second form field name, presenting, in the containerized cluster user interface, a parameter identification component; and receiving a selection of the parameter identification component and responsive to selection of the parameter identification component, presenting, in the CLI component, a portion of the second text that includes the second textual parameter name and the second textual parameter value.

* * * * *